US011989667B2

(12) United States Patent
Le Biannic

(10) Patent No.: US 11,989,667 B2
(45) Date of Patent: *May 21, 2024

(54) INTERPRETATION OF MACHINE LEANING RESULTS USING FEATURE ANALYSIS

(71) Applicant: Business Objects Software Ltd, Dublin (IE)

(72) Inventor: Yann Le Biannic, Suresnes (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,020

(22) Filed: Jun. 5, 2023

(65) Prior Publication Data
US 2023/0316111 A1    Oct. 5, 2023

Related U.S. Application Data

(63) Continuation of application No. 16/712,792, filed on Dec. 12, 2019, now Pat. No. 11,727,284.

(51) Int. Cl.
  *G06N 5/04*  (2023.01)
  *G06N 20/00* (2019.01)

(52) U.S. Cl.
  CPC ............... *G06N 5/04* (2013.01); *G06N 20/00* (2019.01)

(58) Field of Classification Search
  CPC ................................ G06N 5/04; G06N 20/00
  See application file for complete search history.

(56) References Cited

U.S. PATENT DOCUMENTS

| 4,969,097 | A  | 11/1990 | Levin |
| 5,093,914 | A  | 3/1992  | Coplien et al. |
| 5,724,457 | A  | 3/1998  | Fukushima |
| 5,805,159 | A  | 9/1998  | Bertram et al. |
| 5,864,340 | A  | 1/1999  | Bertram et al. |
| 5,959,629 | A  | 9/1999  | Masui |
| 6,002,390 | A  | 12/1999 | Masui |
| 6,321,158 | B1 | 11/2001 | DeLorne et al. |

(Continued)

FOREIGN PATENT DOCUMENTS

| EP | 3422262 | 1/2019 |
| EP | 343797  | 5/2019 |

(Continued)

OTHER PUBLICATIONS

Hammoodi, 2018, pp. 205-239.*

(Continued)

*Primary Examiner* — Michael I Ezewoko
(74) *Attorney, Agent, or Firm* — Klarquist Sparkman, LLP

(57) ABSTRACT

Techniques and solutions are described for analyzing results of a machine learning model. A result is obtained for a data set that includes a first plurality of features. A plurality of feature groups are defined. At least one feature group contains a second plurality of features of the first plurality of features. The second plurality of features is less than all of the first plurality of features. Feature groups can be defined based on determining dependencies between features of the first plurality of features, including using contextual contribution values. Group contextual contribution values can be determined for feature groups by aggregating contextual contribution values of the constituent features of the feature groups.

20 Claims, 15 Drawing Sheets

(56) References Cited

U.S. PATENT DOCUMENTS

| | | |
|---|---|---|
| 6,337,698 B1 | 1/2002 | Keely, Jr. et al. |
| 6,675,169 B1 | 1/2004 | Bennett et al. |
| 6,789,069 B1* | 9/2004 | Barnhill ............... G16B 40/00 |
| | | 706/45 |
| 7,171,353 B2 | 1/2007 | Tower, II et al. |
| 7,194,404 B1 | 3/2007 | Babst et al. |
| 7,387,457 B2 | 6/2008 | Jawerth et al. |
| 7,447,627 B2 | 11/2008 | Jessee et al. |
| 7,689,684 B2 | 3/2010 | Donoho et al. |
| 8,015,482 B2 | 9/2011 | Simova et al. |
| 8,356,046 B2 | 1/2013 | Hille-Doering et al. |
| 8,396,582 B2 | 3/2013 | Kaushal et al. |
| 8,856,676 B1 | 10/2014 | Starenky et al. |
| 9,008,155 B2* | 4/2015 | Di Grazia ............... G01S 19/30 |
| | | 375/147 |
| 9,058,317 B1 | 6/2015 | Gardner et al. |
| 9,183,244 B2* | 11/2015 | Bullis ............... H04L 63/0227 |
| 9,449,344 B2 | 9/2016 | Deshpande et al. |
| 9,934,203 B2 | 4/2018 | Bahgat et al. |
| 10,002,329 B2* | 6/2018 | Mehanna ............... G06N 20/00 |
| 10,034,645 B1 | 7/2018 | Williams |
| 10,140,623 B1* | 11/2018 | Lloyd ............... G06Q 30/0205 |
| 10,452,992 B2* | 10/2019 | Lee ............... G06N 20/00 |
| 10,489,215 B1* | 11/2019 | Wen ............... G06F 11/3442 |
| 10,510,022 B1* | 12/2019 | Tharrington, Jr. ...... G06N 5/045 |
| 10,554,738 B1* | 2/2020 | Ren ............... G06F 9/4818 |
| 10,606,649 B2* | 3/2020 | Baggerman ............... G06F 40/186 |
| 10,706,046 B2 | 7/2020 | Werner et al. |
| 10,719,301 B1 | 7/2020 | Dasgupta et al. |
| 10,831,733 B2* | 11/2020 | Gomez ............... G06N 5/025 |
| 10,832,158 B2* | 11/2020 | Liu ............... G06N 20/00 |
| 10,963,734 B1 | 3/2021 | Wang et al. |
| 10,990,885 B1* | 4/2021 | Wu ............... G06Q 20/405 |
| 11,003,992 B2 | 5/2021 | Wesolowski et al. |
| 11,030,485 B2 | 6/2021 | Karam et al. |
| 11,100,158 B1* | 8/2021 | Han ............... G06F 16/535 |
| 11,176,471 B1* | 11/2021 | DeCaprio ............... G06F 18/2115 |
| 11,232,506 B1 | 1/2022 | Zielnicki |
| 11,288,240 B1 | 3/2022 | Sayad et al. |
| 11,322,225 B2* | 5/2022 | Frey ............... G16B 20/20 |
| 11,341,367 B1 | 5/2022 | Barbosa et al. |
| 11,354,590 B2* | 6/2022 | Gupta ............... G06N 3/084 |
| 11,361,004 B2* | 6/2022 | Han ............... G06F 16/285 |
| 11,386,342 B2* | 7/2022 | Chan ............... G06F 18/2163 |
| 11,429,895 B2* | 8/2022 | Yakovlev ............... G06N 5/01 |
| 11,449,809 B2* | 9/2022 | Bird ............... G06Q 10/04 |
| 11,475,252 B2* | 10/2022 | Neufeld ............... G06F 18/2411 |
| 11,488,713 B2 | 10/2022 | Velez et al. |
| 11,488,041 B2* | 11/2022 | Mehta ............... G06F 11/3476 |
| 11,521,115 B2* | 12/2022 | Weider ............... G06N 20/00 |
| 11,531,915 B2* | 12/2022 | Hetherington ......... G06N 5/025 |
| 11,531,930 B2* | 12/2022 | Guelman ............... G06F 16/285 |
| 11,544,630 B2* | 1/2023 | Karnagel ............... G06N 3/045 |
| 2002/0015042 A1 | 2/2002 | Robotham et al. |
| 2002/0024506 A1 | 2/2002 | Flack et al. |
| 2002/0052900 A1 | 5/2002 | Freeman |
| 2002/0156864 A1 | 10/2002 | Kniest |
| 2002/0169735 A1* | 11/2002 | Kil ............... G06N 5/022 |
| | | 706/46 |
| 2003/0212544 A1 | 11/2003 | Acero et al. |
| 2004/0239681 A1 | 12/2004 | Robotham et al. |
| 2005/0012723 A1 | 1/2005 | Pallakoff |
| 2005/0195221 A1 | 9/2005 | Berger et al. |
| 2005/0223308 A1 | 10/2005 | Gunn et al. |
| 2005/0283364 A1 | 12/2005 | Longe et al. |
| 2006/0020904 A1 | 1/2006 | Aaltonen et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0088356 A1 | 4/2006 | Jawerth et al. |
| 2006/0095842 A1 | 5/2006 | Lehto |
| 2006/0101005 A1 | 5/2006 | Yang et al. |
| 2006/0161870 A1 | 7/2006 | Hotelling et al. |
| 2006/0161871 A1 | 7/2006 | Hotelling et al. |
| 2006/0265648 A1 | 11/2006 | Rainisto et al. |
| 2006/0274051 A1 | 12/2006 | Longe et al. |
| 2007/0061701 A1 | 3/2007 | Thieberger et al. |
| 2007/0061704 A1 | 3/2007 | Simova et al. |
| 2007/0263007 A1 | 11/2007 | Robotham |
| 2008/0097938 A1* | 4/2008 | Guyon ............... G06N 20/10 |
| | | 706/12 |
| 2010/0153956 A1* | 6/2010 | Capps, Jr. ............... G06F 11/3409 |
| | | 712/E9.032 |
| 2013/0212103 A1 | 8/2013 | Cao et al. |
| 2013/0218853 A1* | 8/2013 | Bullis ............... G06F 18/24323 |
| | | 707/694 |
| 2014/0040286 A1 | 2/2014 | Bane et al. |
| 2015/0049791 A1* | 2/2015 | Di Grazia ............... H04B 1/7075 |
| | | 375/149 |
| 2015/0127343 A1 | 5/2015 | Mullor et al. |
| 2015/0379428 A1 | 12/2015 | Dirac et al. |
| 2015/0379429 A1* | 12/2015 | Lee ............... G09B 5/00 |
| | | 706/11 |
| 2015/0379430 A1 | 12/2015 | Dirac et al. |
| 2016/0004621 A1* | 1/2016 | Gongloor ............... G06F 11/3452 |
| | | 707/688 |
| 2016/0055010 A1 | 2/2016 | Baird et al. |
| 2016/0092786 A1* | 3/2016 | Mehanna ............... G06N 20/00 |
| | | 706/11 |
| 2016/0358099 A1* | 12/2016 | Sturlaugson ............ G06N 5/043 |
| 2017/0060356 A1 | 3/2017 | Oota et al. |
| 2017/0068675 A1* | 3/2017 | Hazel ............... G06F 16/252 |
| 2017/0185242 A1 | 6/2017 | Jann et al. |
| 2017/0329466 A1 | 11/2017 | Krenkler et al. |
| 2018/0022539 A1* | 1/2018 | Vedani ............... B65D 85/1081 |
| | | 206/256 |
| 2018/0107711 A1* | 4/2018 | Tariq ............... G06F 16/24534 |
| 2018/0136332 A1 | 5/2018 | Barfield, Jr. et al. |
| 2018/0157987 A1 | 6/2018 | Schmitdt-Karaca |
| 2018/0165599 A1 | 6/2018 | Pete et al. |
| 2018/0225391 A1* | 8/2018 | Sali ............... G06F 7/588 |
| 2018/0285777 A1 | 10/2018 | Li et al. |
| 2018/0285798 A1* | 10/2018 | Kearns ............... G06Q 10/0637 |
| 2018/0332082 A1 | 11/2018 | Baumgart et al. |
| 2018/0349795 A1 | 12/2018 | Boyle et al. |
| 2018/0349986 A1* | 12/2018 | Fidanza ............... G06Q 40/02 |
| 2018/0357511 A1* | 12/2018 | Misra ............... G06N 5/025 |
| 2018/0357541 A1* | 12/2018 | Chen ............... G06N 3/04 |
| 2019/0034881 A1 | 1/2019 | Taylor et al. |
| 2019/0042867 A1* | 2/2019 | Chen ............... G06F 9/5044 |
| 2019/0068365 A1 | 2/2019 | Wright et al. |
| 2019/0073293 A1 | 3/2019 | Sarferaz et al. |
| 2019/0080347 A1 | 3/2019 | Smith |
| 2019/0102361 A1* | 4/2019 | Muralidharan ....... G06F 11/302 |
| 2019/0147361 A1 | 5/2019 | Matsumoto et al. |
| 2019/0147369 A1* | 5/2019 | Gupta ............... G06N 3/126 |
| | | 706/12 |
| 2019/0156216 A1* | 5/2019 | Gupta ............... G06N 3/126 |
| 2019/0078361 A1 | 6/2019 | Brueckner et al. |
| 2019/0188251 A1 | 6/2019 | Liu et al. |
| 2019/0197141 A1* | 6/2019 | Gomez ............... G06F 3/0482 |
| 2019/0209022 A1 | 7/2019 | Sobol et al. |
| 2019/0228261 A1 | 7/2019 | Chan |
| 2019/0318099 A1 | 10/2019 | Carvalho et al. |
| 2019/0325333 A1* | 10/2019 | Chan ............... G06F 18/23213 |
| 2019/0325335 A1* | 10/2019 | Chan ............... G06N 5/01 |
| 2019/0332895 A1 | 10/2019 | Anghel et al. |
| 2019/0340095 A1* | 11/2019 | Faibish ............... G06F 11/302 |
| 2019/0347511 A1* | 11/2019 | Jiang ............... G06F 16/24578 |
| 2019/0370634 A1 | 12/2019 | Morenco et al. |
| 2019/0370687 A1 | 12/2019 | Pezzillo et al. |
| 2019/0370731 A1 | 12/2019 | Mota Manhaes et al. |
| 2019/0378210 A1* | 12/2019 | Merrill ............... G06N 5/01 |
| 2019/0391956 A1 | 12/2019 | Kozhaya et al. |
| 2019/0392075 A1* | 12/2019 | Han ............... G06F 16/285 |
| 2019/0392255 A1* | 12/2019 | Franklin ............... G06F 18/285 |
| 2019/0392345 A1 | 12/2019 | Adaska et al. |
| 2020/0034197 A1* | 1/2020 | Nagpal ............... G06F 9/50 |
| 2020/0050968 A1* | 2/2020 | Lee ............... G06N 20/00 |
| 2020/0074306 A1* | 3/2020 | Giral ............... G06N 20/20 |
| 2020/0082013 A1* | 3/2020 | Triplet ............... G06N 5/022 |
| 2020/0118036 A1* | 4/2020 | Karnagel ............... G06N 3/088 |
| 2020/0125545 A1* | 4/2020 | Idicula ............... G06N 20/20 |

(56) References Cited

U.S. PATENT DOCUMENTS

| | | | |
|---|---|---|---|
| 2020/0125568 A1* | 4/2020 | Idicula | G06N 20/20 |
| 2020/0153701 A1 | 5/2020 | Mohan et al. | |
| 2020/0160998 A1* | 5/2020 | Ward | G06F 18/2185 |
| 2020/0184380 A1 | 6/2020 | Thomas et al. | |
| 2020/0210696 A1 | 7/2020 | Hou et al. | |
| 2020/0210769 A1 | 7/2020 | Hou et al. | |
| 2020/0279182 A1* | 9/2020 | So | G06N 20/00 |
| 2020/0285939 A1 | 9/2020 | Baker | |
| 2020/0302318 A1* | 9/2020 | Hetherington | G06N 20/20 |
| 2020/0302524 A1* | 9/2020 | Kamkar | G06N 20/20 |
| 2020/0311573 A1 | 10/2020 | Desai et al. | |
| 2020/0327357 A1* | 10/2020 | Karnagel | G06F 18/2148 |
| 2020/0327448 A1* | 10/2020 | Yakovlev | G06N 3/048 |
| 2020/0342347 A1 | 10/2020 | Gambetta et al. | |
| 2020/0356824 A1* | 11/2020 | Neufeld | G06F 18/214 |
| 2020/0372395 A1 | 11/2020 | Muhmud et al. | |
| 2020/0380155 A1 | 12/2020 | Sarferaz | |
| 2020/0380399 A1 | 12/2020 | Weider et al. | |
| 2020/0387835 A1* | 12/2020 | Sandepudi | G06N 7/023 |
| 2020/0401931 A1 | 12/2020 | Duan et al. | |
| 2021/0004712 A1 | 1/2021 | Sarferaz et al. | |
| 2021/0042290 A1 | 2/2021 | Banipal et al. | |
| 2021/0042657 A1 | 2/2021 | Tiruveedhula | |
| 2021/0049503 A1* | 2/2021 | Nourian | G06F 11/3466 |
| 2021/0056164 A1 | 2/2021 | Mustafi et al. | |
| 2021/0065191 A1* | 3/2021 | De Shetler | G06N 20/00 |
| 2021/0073627 A1 | 3/2021 | Sarferaz et al. | |
| 2021/0081848 A1 | 3/2021 | Polleri et al. | |
| 2021/0110299 A1* | 4/2021 | Bisson-Krol | G06F 18/2178 |
| 2021/0117775 A1 | 4/2021 | Ziotnick | |
| 2021/0117863 A1* | 4/2021 | Soleimani | G06N 20/00 |
| 2021/0118122 A1* | 4/2021 | Guyduy | G06N 20/20 |
| 2021/0133612 A1 | 5/2021 | Sinha et al. | |
| 2021/0136098 A1* | 5/2021 | Stergioudis | G06N 20/10 |
| 2021/0142253 A1* | 5/2021 | Cohen | G06Q 30/0202 |
| 2021/0150391 A1* | 5/2021 | Guillemet | G06N 5/045 |
| 2021/0150541 A1* | 5/2021 | Gurbuxani | G06N 20/10 |
| 2021/0174258 A1* | 6/2021 | Wenchel | G06N 20/00 |
| 2021/0182698 A1* | 6/2021 | Le Biannic | G06N 5/04 |
| 2021/0192376 A1* | 6/2021 | Sarferaz | G06F 40/40 |
| 2021/1092283 | 6/2021 | Guo et al. | |
| 2021/0209501 A1 | 7/2021 | Sarferaz et al. | |
| 2021/0216904 A1 | 7/2021 | Khurana et al. | |
| 2021/0216912 A1 | 7/2021 | Hasse-Schuetz et al. | |
| 2021/0232978 A1* | 7/2021 | Cai | G06N 5/01 |
| 2021/0233182 A1 | 7/2021 | Laik | |
| 2021/0241168 A1 | 8/2021 | Sarferaz | |
| 2021/0241170 A1 | 8/2021 | Sarferaz et al. | |
| 2021/0241852 A1* | 8/2021 | Frey | G16B 25/00 |
| 2021/0248503 A1* | 8/2021 | Hickey | G06F 18/2113 |
| 2021/0264312 A1 | 8/2021 | Sarferaz et al. | |
| 2021/0312317 A1 | 10/2021 | Sarferaz et al. | |
| 2021/0334280 A1* | 10/2021 | Medvedev | G06F 16/2474 |
| 2021/0342738 A1* | 11/2021 | Sarferaz | G06Q 10/10 |
| 2022/0044133 A1* | 2/2022 | Otto | G06F 18/214 |
| 2022/0050695 A1 | 2/2022 | Gajendran et al. | |
| 2022/0100714 A1* | 3/2022 | Zhao | G06V 30/274 |
| 2022/0101190 A1* | 3/2022 | Kanter | G06F 16/906 |
| 2022/0114345 A1* | 4/2022 | Belém | G06N 3/0895 |
| 2022/0129791 A1* | 4/2022 | Nia | G06F 18/2414 |
| 2022/0154281 A1* | 5/2022 | Boucher | G16B 30/00 |
| 2022/0198277 A1* | 6/2022 | Nia | G06N 3/047 |
| 2022/0201030 A1* | 6/2022 | Petit | H04L 63/20 |
| 2022/0207326 A1* | 6/2022 | Zaker Habibabadi | G06N 3/045 |
| 2022/0237415 A1* | 7/2022 | Lohia | G06F 18/2155 |
| 2022/0277550 A1* | 9/2022 | Bäckström | G06N 20/00 |
| 2022/0327693 A1 | 10/2022 | Kim | |
| 2022/0336049 A1* | 10/2022 | Frey | C12N 15/113 |
| 2022/0366297 A1* | 11/2022 | Pushak | G06N 20/00 |
| 2022/0366315 A1* | 11/2022 | Desreumaux | G06N 20/20 |
| 2022/0370409 A1* | 11/2022 | Schmidt | A61P 25/24 |
| 2022/0374746 A1* | 11/2022 | Chan | G06N 7/00 |
| 2023/0148337 A1 | 5/2023 | Sarferaz | |

FOREIGN PATENT DOCUMENTS

| | | |
|---|---|---|
| EP | 3843017 | 6/2021 |
| WO | WO 2015067087 | 5/2015 |
| WO | WO 2018017467 | 1/2018 |
| WO | WO 2018217903 | 11/2018 |
| WO | WO 2021050391 | 3/2021 |

OTHER PUBLICATIONS

Dodge, Mar. 2019, pp. 275-285.*

Villagra-Arnedo, 2017, pp. 621-631.*

Lundberg, 2019, sections 1-6.*

Ribeiro, 2016, sections 1-9.*

Notice of Allowance received in U.S. Appl. No. 16/712,792, dated Mar. 6, 2023, 48 pages.

Hammoodi, et al., "Real-time feature selection technique with concept drift detection using adaptive micro-clusters for data stream mining," Elsevier, 161:205-239 Dec. 1, 2018, 35 pages.

Dodge, et al, "Explaining Models: An Empirical Study of How Explanations Impact Fairness Judgment," IUI '19, pp. 275-285, Mar. 17-20, 2019, 11 pages.

Villagra-Arnedo, et al., "Improving the expressiveness of black-box models for predicting student performance," Computers in Human Behavior, 72:621-631, 2017, 11 pages.

Final Office Action received in U.S. Appl. No. 16/865,021, dated May 4, 2023, 27 pages.

Non-Final Office Action received in U.S. Appl. No. 16/725,734, dated May 25, 2023, 21 pages.

Notice of Allowance received in U.S. Appl. No. 18/096,421, dated Sep. 13, 2023, 20 pages.

Final Office Action received in U.S. Appl. No. 16/725,734, dated Oct. 4, 2023, 19 pages.

Ben-Hur et al., "A User's Guide to Support Vector Machines," http://pyml.sourceforge.net/doc/howto.pdf, at least as early as May 1, 2020, 18 pages.

Jain, "Simple Tutorial on SVM and Parameter Tuning in Python and R," https://www.hackerearth.com/blog/developers/simple-tutorial-svm-parameter-tuning-python-r/, Feb. 21, 2017, 10 pages.

"Types of Machine Learning Algorithms You Should Know," https://towardsdatascience.com/types-of-machine-learning-algorithms-you-should-know-953a08248861?gi=1228b51fc8a3, Jun. 15, 2017, 8 pages.

Interpreting random forests, https://blog.datadive.net/interpreting-random-forests/, Oct. 1, 2014, 16 pages.

Sidana, "Intro to types of classification algorithms in Machine Learning," https://medium.com/sifium/machine-learning-types-of-classification-9497bd4f2e14, Feb. 28, 2017, 5 pages.

Applying Multinomial Naïve Bayes to NLP Problems: A Practical Explanation, https://medium.com/syncedreview/applying-multinomial-naive-bayes-to-nlp-problems-a-practical-explanation-4f5271768ebf, Jul. 17, 2017, 9 pages.

Ray, "6 Easy Steps to Learn Naïve Bayes Algorithm with codes in Python and R," https://www.analyticsvidhya.com/blog/2017/09/naive-bayes-explained/, Sep. 11, 2017, 26 pages.

Naïve Bayes classifier for multinomial models, https://scikit-learn.org/stable/modules/generated/sklearn.naive_bayes.MultinomialNB.html#sklearn.naive_bayes.MultinomialNB, at least as early as May 1, 2020, 5 pages.

Lundberg et al, "Consistent Individualized Feature Attribution for Tree Ensembles," https://arxiv.org/pdf/1802.03888.pdf, Mar. 7, 2019, 9 pages.

Simpson's paradox, Wikipedia, https://en.wikipedia.org/wiki/Simpson%27s_paradox, at least as early as May 1, 2020, 6 pages.

Strings as features in decision tree/random forest, machine learning—strings as features in decision tree/random forest—Data Science Stack Exchange, at least as early as May 1, 2020, 6 pages.

Mutual information, Wikipedia, https://en.wikipedia.org/wiki/Mutual_information, at least as early as May 1, 2020, 10 pages.

Kratzer et al., "varrank: An R Package for Variable Ranking Based on Mutual Information with Applications to Systems Epidemiology," https://www.math.uzh.ch/pages/varrank/articles/varrank.html, Jan. 29, 2020, 27 pages.

(56) References Cited

OTHER PUBLICATIONS

Ribeiro et al., "Why Should I Trust You?" Explaining the Predictions of Any Classifier, https://arxiv.org/pdf/1602.04938.pdf, Aug. 9, 2016, 10 pages.

Basic classification: Classify images of clothing, https://www.tensorflow.org/tutorials/keras/classification, at least as early as May 1, 2020, 17 pages.

Nishida, "Finding Variable Importance with Random Forest & Boruta," https://blog.exploratory.io/finding-variable-importance-with-random-forest-boruta-28badd116197?gi=8b6a24a3a90a, Sep. 27, 2019, 9 pages.

Brownlee, "Linear Regression for Machine Learning," https://machinelearningmastery.com/linear-regression-for-machine-learning/, Mar. 25, 2016, 28 pages.

Cross-validation(statistics), Wikipedia, https://en.wikipedia.org/wiki/Cross-validation_(statistics), at least as early as May 1, 2020, 12 pages.

Brownlee, "What is the Difference Between a Parameter and a Hyperparameter?" https://machinelearningmastery.com/difference-between-a-parameter-and-a-hyperparameter/, Jul. 26, 2017, 29 pages.

Parkinson, "SAP Data Intelligence: Create your first AutoML Scenario," https://blogs.sap.com/2019/12/18/sap-data-intelligence-create-your-first-automl-scenario/, Dec. 18, 2019, 16 pages.

"Input Field," retrieved from: https://experience.sap.com/fiori-design-web/input-field/, Feb. 4, 2019, 29 pages.

Model Parameters and Hyperparameters in Machine Learning—What is the difference? https://towardsdatascience.com/model-parameters-and-hyperparameters-in-machine-learning-what-is-the-difference-702d30970f6, Oct. 20, 2019, 7 pages.

Gradient descent, Wikipedia, https://en.wikipedia.org/wiki/Gradient_descent, at least as early as Apr. 1, 2020, 6 pages.

Cullen, PAi Series Blog 3: Training and Activating the out of the box predictive content shipped by S/4HANA, https://blogs.sap.com/2019/02/07/pai-series-blog-3-training-and-activating-the-out-of-the-box-predictive-content-shipped-by-s4hana/, Feb. 7, 2019, 25 pages.

Extended European Search Report received in related European Patent Application No. 20215206.2, dated Jun. 18, 2021, 11 pages.

Scholbeck et al., "Sampling Intervention, Prediction, Aggregation: A Generalized Framework for Model-Agnostic Interpretations," arxiv.org, Cornell University Library, 201 Olin Library Cornell University, Ithaca, NY, Apr. 8, 2019, 12 pages.

Extended European Search Report received in related European Patent Application No. 20213362.5, May 21, 2021, 13 pages.

Cohen et al., "Feature Selection Based on the Shapley Value," IJCAI '05: Proceedings of the $19^{th}$ International Joint Conference on Artificial Intelligence, Jul. 1, 2005, pp. 665-670.

Lin Chin-Fang, "Application-grounded evaluation of predictive model explanation methods," Master Thesis—Department of Mathematics and Computer Science Data Mining Research Group, Sep. 24, 2018, pp. 1-57. Retrieved from the Internet: https://pure.tue.nl/ws/portalfiles/portal/109407025/CSE667_master_thesis_C_Lin_final_version.pdf.

Messalas Andreas et al., "Model-Agnostic Interpretability with Shapley Values," 2019 $10^{th}$ International Conference on Informational Intelligence, Systems and Applications, (IISA), IEEE, Jul. 15, 2019, pp. 1-7.

Gong et al., "Diversity in Machine Learning," IEEE Access, vol. 7, May 17, 2019, pp. 64323-64350.

Non-Final Office Action received in U.S. Appl. No. 16/797,835, filed May 10, 2022, 50 pages.

Notice of Allowance received in U.S. Appl. No. 16/837,518, dated Jul. 28, 2022, 18 pages.

Final Office Action received in U.S. Appl. No. 16/797,835, dated Aug. 10, 2022, 26 pages.

Non-Final Office Action received in U.S. Appl. No. 16/725,734, dated Sep. 9, 2022, 25 pages.

Non-Final Office Action received in U.S. Appl. No. 16/865,021, dated Oct. 6, 2022, 24 pages.

Non-Final Office Action received in U.S. Appl. No. 16/47,018, dated Jan. 4, 2022, 26 pages.

Notice of Allowance received in U.S. Appl. No. 16/427,018, dated Jul. 21, 2022, 8 pages.

Non-Final OA received in U.S. Appl. No. 16/567,695, dated Jul. 27, 2022, 8 pages.

Notice of Allowance received in U.S. Appl. No. 16/735,089, dated Jul. 26, 2022, 10 pages.

Non-Final Office Action received in U.S. Appl. No. 16/782,512, dated Jun. 22, 2022, 30 pages.

Notice of Allowance received in U.S. Appl. No. 16/387,518, dated Nov. 15, 2022, 14 pages.

Final Office Action received in U.S. Appl. No. 16/725,734, dated Dec. 30, 2022, 19 pages.

* cited by examiner

INTERPRETATION OF MACHINE LEANING RESULTS USING FEATURE ANALYSIS

CROSS REFERENCE TO RELATED APPLICATIONS

This application is a continuation of U.S. patent application Ser. No. 16/712,792, filed Dec. 12, 2019, which is hereby incorporated herein by reference.

FIELD

The present disclosure generally relates to interpreting machine learning models, including results provided by machine learning models and operation of machine learning models. Particular implementations relate to analyzing features used as input for the machine learning model to identify relationships between features, including, in an embodiment, grouping features into feature groups.

BACKGROUND

Machine learning is increasingly being used to make, or help make, various decisions, or to otherwise analyze data. Machine learning techniques can be used to analyze data more quickly or accurately that could be performed by a human. In some cases, it can be impracticable for humans to manually analyze a data set. Thus, machine learning has facilitated the rise of "big data," by providing ways that such data can be put to practical use.

However, even for experts in the field, machine learning can be complicated to understand. The situation can be even more complex when machine learning is applied to particular applications in particular fields. That is, a computer scientist may understand the algorithms used in a machine learning technique, but may not understand the subject matter domain well enough to ensure that a model is accurately trained or to properly evaluate results provided by machine learning. Conversely, a domain expert may be well versed in a given subject matter area, but may not understand how the machine learning algorithms work.

Consequently, if users do not understand how a machine learning model works, they may not have confidence in the results provided by machine learning. If users are not confident in the results of machine learning, they may be less likely to use machine learning at all, possibly foregoing advantages that could be gained. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for analyzing results of a machine learning model. A result is obtained for a data set that includes a first plurality of features. A plurality of feature groups are defined. At least one feature group contains a second plurality of features of the first plurality of features. The second plurality of features is less than all of the first plurality of features. Feature groups can be defined based on determining dependencies between features of the first plurality of features, including using contextual contribution values. Group contextual contribution values can be determined for feature groups by aggregating contextual contribution values of the constituent features of the feature groups.

A method is provided for forming feature groups. A training data set is received. The training data set includes values for a first plurality of features. A machine learning algorithm is trained using the training data set to provide a machine learning algorithm. An analysis data set is processed using the trained machine learning algorithm to provide a result. A plurality of feature groups are formed. At least one of the feature groups includes a second plurality of features of the first plurality of features. The second plurality of features is a proper subset of the first plurality of features.

According to another embodiment, a method is provided for forming feature groups using dependencies between features in a data set. A training data set is received. The training data set includes values for a first plurality of features. A machine learning algorithm is trained using the training data set to provide a trained machine learning algorithm. An analysis data set is processed using the trained machine learning algorithm to provide a result. Contextual contribution values are determined for a second plurality of the first plurality of features. Dependencies between features of the second plurality of features are determined. A plurality of feature groups are formed based at least in part on the determined dependencies. At least one feature group of the plurality of feature groups includes a third plurality of features of the first plurality of features. The third plurality of features is a proper subset of the first plurality of features.

According to a further aspect, a method is provided for determining feature group contribution values. A first plurality of features used in a machine learning algorithm are determined. A plurality of feature groups are formed, such as using analysis of machine learning results, semantic analysis, statistical analysis, data lineage, or combinations thereof. At least one feature group of the plurality of feature groups includes a second plurality of features of the first plurality of features. The second plurality of features is a proper subset of the first plurality of features. A result is determined for an analysis data set using the machine learning algorithm. For at least a portion of the feature groups, contribution values for features of respective feature groups to the result are aggregated to provide feature group contribution values.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
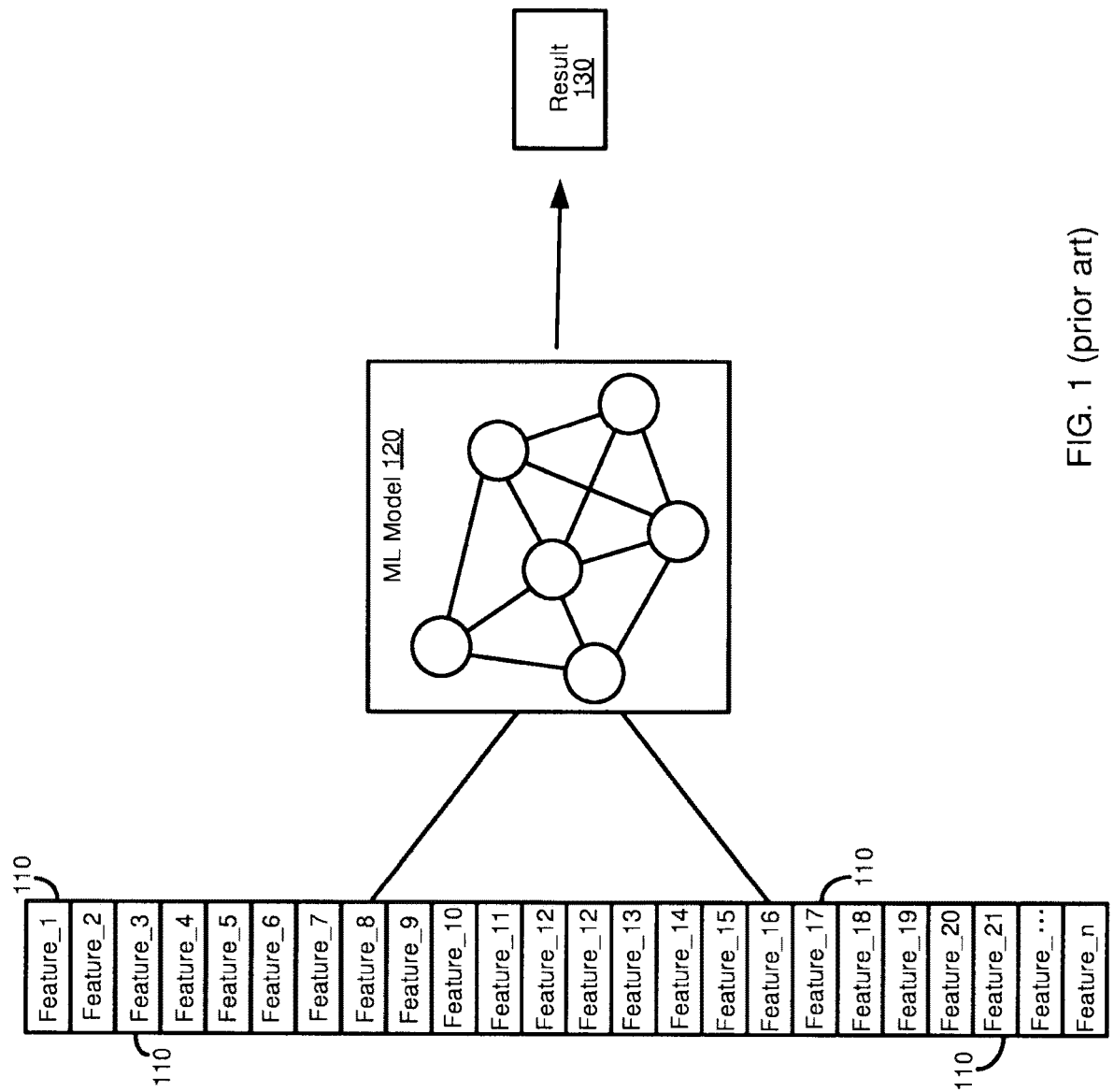
FIG. 1 is a schematic diagram illustrating how values used as input for a machine learning model, either to train the model or for classification, can be associated with features.

Machine learning is increasingly being used to make, or help make, various decisions, or to otherwise analyze data. Machine learning techniques can be used to analyze data more quickly or accurately that could be performed by a human. In some cases, it can be impracticable for humans to manually analyze a data set. Thus, machine learning has facilitated the rise of "big data," by providing ways that such data can be put to practical use.

However, even for experts in the field, machine learning can be complicated to understand. The situation can be even more complex when machine learning is applied to particular applications in particular fields. That is, a computer scientist may understand the algorithms used in a machine learning technique, but may not understand the subject matter domain well enough to ensure that a model is accurately trained or to properly evaluate results provided by machine learning. Conversely, a domain expert may be well versed in a given subject matter area, but may not understand how the machine learning algorithms work.

Consequently, if users do not understand how a machine learning model works, they may not have confidence in the results provided by machine learning. If users are not confident in the results of machine learning, they may be less likely to use machine learning at all, possibly foregoing advantages that could be gained.

As an example, machine learning models can often use tens, hundreds, or thousands of input parameters, which can also be referred to as features or variables. It can be difficult for users to understand how a given variable influences, or contributes, to a result, such as a prediction, provided by a machine learning model. In at least some cases, it is possible to quantify the contribution of a particular variable to a particular type of result (e.g., the result generally provided by the machine learning model), or a specific result for a particular set of input features. Once beyond a handful of variables are used for a given machine learning model, however, it may be difficult for a user to understand how an individual variable contributes to a model. If users do not understand how a variable contributes, they may not trust the model or the results.

In addition, even if the user sufficiently trusts the model and its result, if the user does not understand what contributed to the result, the user may not be provided with actionable information, reducing the utility of the machine learning model. Take for example a machine learning model that provides a prediction of success for a given set of conditions. For a particular set of conditions, assume the machine learning model provides a prediction of a 75% chance of a successful outcome being achieved. In order to make a final decision, a user may find it helpful to understand what factors tend to indicate success or what factors tend to indicate failure. It could be that, for particular circumstances, a human might weight a factor more or less than the machine learning model, or a human might be able to take steps to mitigate unfavorable variables. For future behavior, a user might want to understand steps that could be taken to improve success. If the machine learning model takes into account, say, 1000 variables, it may be difficult for an individual to understand how single variables, or combinations of variables, contributed to a result, and how different values for the variable might affect future results. Accordingly, room for improvement exists.

The present disclosure facilitates the design of machine learning models and the analysis of machine learning results by grouping at least some input parameters for a machine learning model, which can be referred to as features, in one or more feature groups. Examples of machine learning techniques with which disclosed technologies can be used include, without limitation, logistic regression, Bayesian algorithms (e.g., Naive Bayes), k-nearest neighbors, decision trees, random forests, gradient boosting frameworks, support vector machines, and various types of neural networks.

Contributions to a machine learning result can be determined for at least a portion of features used in a particular machine learning technique (e.g., for a particular application), such as for features in a feature group. For a given feature group, the individual contributions of the features in the feature group can be summed, or otherwise combined, to provide a contribution, or significance value, of the feature group towards a machine learning result. The significance value of a feature group can be the sum or other aggregation of the contributions (or significance values) of the features in the feature group. In a specific example, the significance value for a feature group is calculated as the mean of the significance values of features in the feature group.

As an example, consider a machine learning model that uses features A-Z as input. Assume that a feature group is defined as including features A-D. If it is determined that feature A contributes 4% to a result, feature B contributes 5% to a result, feature C contributes 2% to a result, and feature D contributes 3% to a result, the overall contribution of the feature group is 14%. If the features A-Z are divided into four groups, it can be much easier to compare the contribution of the groups towards a machine learning result than comparing the twenty-six individual features without organization.

Thus, disclosed technologies can provide higher-level information about a machine learning model that is easier for humans to understand and act upon. If a user wants to obtain more information about how a given feature contributes to its feature group, or to a result/model overall, the user can drill down into the feature group to see the contributions of its constituent features. Having the attributes organized by feature group, and first seeing the overall contribution of the feature group to a prediction, can help a user then understand how individual features contribute to a prediction, and how they might be adjusted in the future to change a prediction.

In some cases, a given feature is included in a single feature group. In other cases, a given feature can be included in multiple feature groups, although in such case the contribution of all features/feature groups for a machine learning model might exceed 100%. In some scenarios where a feature is included in multiple groups, it is "active" only for a single group at a time. For example, if a feature is assigned to Group A and Group B, if it is active in Group A, it is inactive in Group B. Or, during a particular scenario, Group A or Group B may be set as active or inactive. In another scenario, when a feature is included in multiple feature groups, the multiple groups may be determined using different techniques—such as having groups formed manually, using mutual information, using schema information etc. While in some cases, groups used in a particular analysis are all of the same type (e.g., determined using mutual information), in other cases groups used in a particular analysis can include groups having different types (e.g., an analysis can have a manually defined group, a group determined using schema information, and a group determined using mutual information). Or, a single group can be defined using multiple considerations—such as defining a group using a combination of schema information and mutual information.

Similarly, in some cases all features for a machine learning model are included in at least one feature group, while in other cases one more features need not be included in a feature group.

Feature groups can be defined in a variety of ways. In some cases, feature groups can be defined based on a structure of one or more data sources (sometimes referred to as data lineage). For example, at least some of the input for a machine learning model may be associated with data stored in a star schema. Data for particular tables, such as for particular dimension tables, can be at least putatively assigned to a feature group. Similarly, tables having relationships between attributes, such as a foreign key relationship or an association, can indicate that the tables, or at least the related attributes, should be included, or considered for inclusion, in a feature group.

Data access patterns can also be used to suggest feature groups. For example, data used for a machine learning model may be obtained by joining two or more tables in a relational database. The tables included in the join, or in other data access operations, can be included as individual feature groups.

A user can manually assign features to feature groups, including changing features in a suggested feature group, breaking a feature group into sub groups, or combining two or more groups into a larger feature group. For example, feature groups may be initially selected by data relationships (e.g., being in a common table or related table) or data access consideration (e.g., joins). A user may then determine that features should be added to or removed from these groups, that two groups should be combined, a single group split into two or more groups, etc.

In other cases, feature groups can be determined, or modified, by evaluating relationships between features. For example, if a first feature is determined to have a correlation to a second feature, the first and second features may be indicated as belonging to a common feature group. Feature groups suggested by other methods, such as based on data relationships or manual selection, can be modified based on evaluating relationships between features. In the case of a feature group based on a dimension table, it may be determined that one or more attributes of the dimension table are not significantly correlated. Such attributes can be removed from the group. Similar, it may be determined that a feature of another dimension table is significantly correlated, and such dimension may be added to the feature group.

Feature groups can be modified or filtered based on other criteria. In particular, features may be omitted from a feature group to which they might otherwise belong if the predictive power of the feature is below a threshold. Or, features can be filtered in this manner before features are analyzed for membership in a feature group, including presenting to a user a selection of features satisfying the threshold for possible inclusion in a feature group.

In addition to being useable to help analyze results providing by a machine learning model, feature groups can be used in developing or training machine learning models. For example, a machine learning model can be tailored for a particular use by selecting or emphasizing (e.g., weighting) feature groups of interest. Similarly, machine learning models can be made more accurate or efficient by eliminating consideration of features that have low predictive power/ are not part of relevant feature groups.

In some implementations, feature groups are analyzed for causality cycles. That is, considering a feature group A and a feature group B, it may be permissible for a feature of group A to influence (or cause) a feature of group B. However, it may not be also permissible for a feature of group B to influence a feature of group A. If a causality cycle is observed, feature groups can be reconfigured to remove such cycles. However, in other cases feature groups can be defined without regard to causality cycles.

In some cases, it may be useful to include or exclude groups with causal dependencies in determining what features/feature groups to use to train or retrain a machine learning model. For example, it may be useful to isolate the effect of a particular feature by excluding from analysis (or training of a machine learning model) feature groups that have a causal dependency on a feature of a selected feature group.

As described above, while some aspects of the present disclosure define feature groups based on analysis of machine learning results, other aspects can be used to define feature groups without using such analysis, such as defining feature groups based on semantic analysis, data lineage, or non-machine learning statistical methods. In yet further aspects, one or more machine-learning based feature group definition methods can be used in conjunction with one or more non-machine-learning based feature group definition methods.

Example 2—Example Use of Features for Training and Use of Machine Learning Models FIG. 1 schematically depicts how a plurality of features 110 can be used as input to a machine learning model 120 to provide a result 130. Typically, the types of features 110 used as input to provide the result 130 are those used to train a machine learning algorithm to provide the machine learning model 120. Training and classification can use discrete input instances of the features 110, where each input instance has values for at least a portion of the features. Typically, the features 110, and their respective values, are provided in a way that uses a particular feature in a particular way. For example, each feature 110 may be mapped to a variable that is used in the machine learning model.

The result 130 maybe be a qualitative or quantitative value, such as a numeric value indicating a likelihood that a certain condition will hold or a numeric value indicting a relative strength of an outcome (e.g., with high number indicating stronger/more valuable outcomes). For qualitative results, the result 130 might be, for example, a label applied based on the input features 110 for a particular input instance.

Note that for any of these results, typically the result 130 itself does not provide information about how the result was determined. Specifically, the result 130 does not indicate how much any given feature 110 or collection of features contributed to the result. However, in many cases, one or more features 110 will contribute positively towards the result, and one or more features may argue against the result 130, and instead may contribute to another result which was not selected by the machine learning model 120.

Thus, for many machine learning applications, a user may be unaware of how a given result 130 relates to the input features for a particular use of the machine learning model. As described in Example 1, if users are unsure what features 110 contributed to a result 130, or to how or to what degree they contribute, they may have less confidence in the result. In addition, users may not know how to alter any given feature 110 in order to try and obtain a different result 130.

In at least some cases, it is possible to determine (for an individual classification results as an average or other statistical measure of a machine learning model 120 over a number of input instances) how features 110 contribute to results for a machine learning model. In particular, Lundberg, et al., "Consistent Individualized Feature Attribution for Tree Ensembles" (available at https://arxiv.org/abs/1802.03888, and incorporated by reference herein) describes how SHAP (Shapley additive explanation) values can be calculated for attributes used in a machine learning model, allowing the relative contribution of features 110 to be determined. However, other contextual interpretability measures (which can also be termed contextual contribution values) may be used, such as those calculated using the LIME (local interpretable model-agnostic explanations) technique, described in Ribeiro, et al., "'Why Should I Trust You?' Explaining the Predictions of Any Classifier," available at https://arxiv.org/pdf/1602.04938.pdf, and incorporated by reference herein. In general, a contextual contribution value is a value that considers the contribution of a feature to a machine learning result in the context of other features used in generating the result, as opposed to, for example, simply considering in isolation the effect of a single feature on a result.

Contextual SHAP values can be calculated as described in Lundberg, et al., using as using the equation:

$$\phi_i = \sum_{S \subseteq N\{i\}} \frac{|S|!(M-|S|-1)!}{M!}[f_x(S \cup \{i\}) - f_x(S)]$$

as defined and used in Lundberg, et al.

A single-variable (or overall) SHAP contribution (the influence of the feature on the result, not considering the feature in context with other features used in the model), $\phi_1$, can be calculated as:

$$\psi_X = \phi_1 = logit(\hat{P}(Y|X)) - logit(\hat{P}(Y))$$

$$\text{Where: } logit(\hat{P}(Y|X)) = logit(\hat{P}(Y)) + \sum_{i=1}^{1}\phi_i$$

$$\text{And } logit(p) = \log\frac{p}{1-p}$$

The above value can be converted to a probability scale using:

$$\hat{P}(Y|X) = s(\psi_X + logit(\hat{P}(Y)))$$

Where s is the sigmoid function:

$$s(x) = \frac{1}{1+e^{-x}}$$

Figure 2:
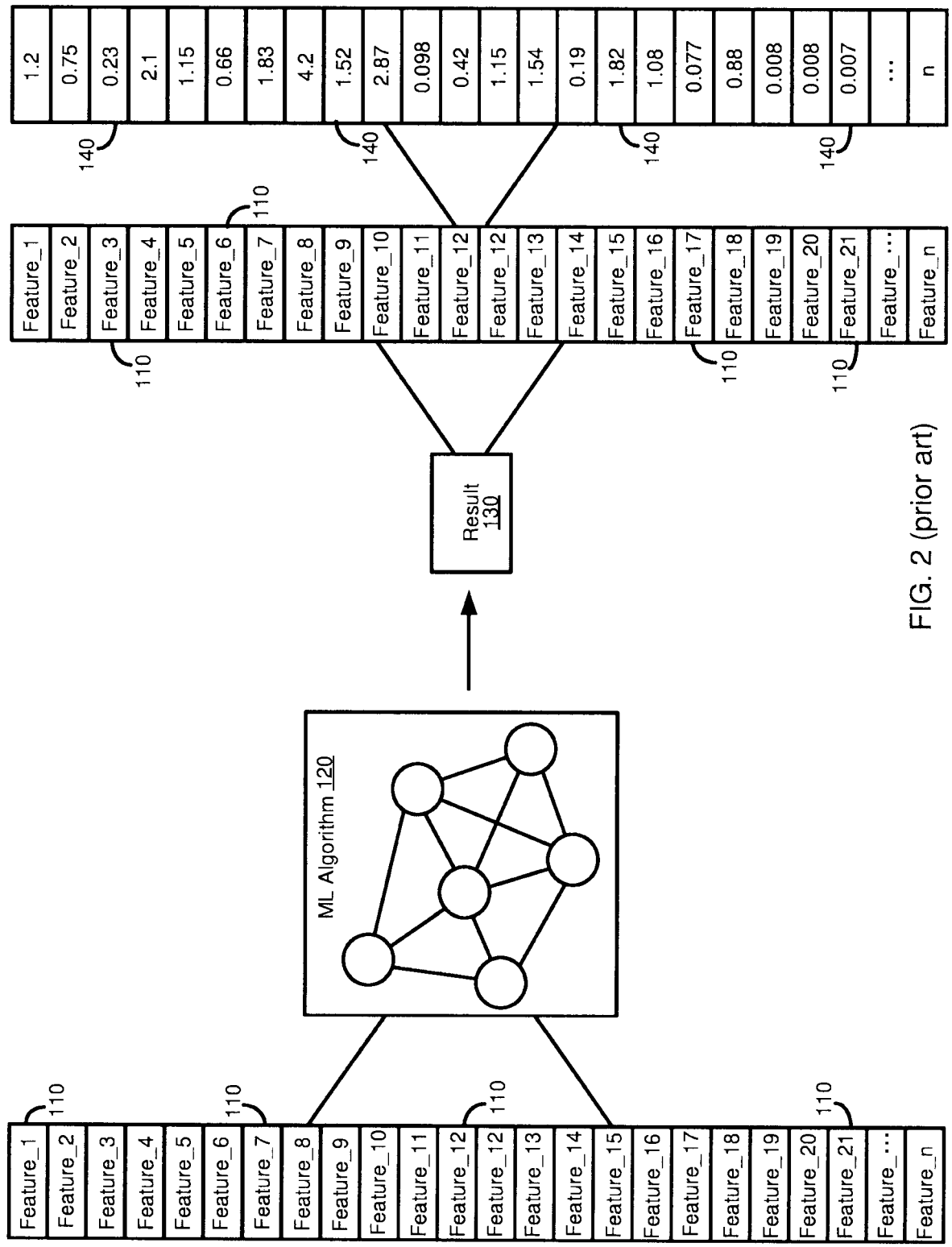
FIG. 2 is a schematic diagram illustrating how values used as input for a machine learning model, either to train the model or for classification, can be associated with features, and how different features can contribute to a result in differing degrees.

FIG. 2 is generally similar to FIG. 1, but illustrates how contribution values 140 (such as those calculated using the SHAP methodology) can be calculated for features 110. As explained in Example 1, a large number of features 110 are used with many machine learning models. Particularly if the contribution value 140 of each (or most or many) or the features 110 is comparatively small, it can be difficult for a user to understand how any feature contributes to results provided by a machine learning model, including for a particular result 130 of a particular set of values for the features 110.

Similarly, it can be difficult for a user to understand how different combinations of features 110 may work together to influence results of the machine learning model 120.

Example 3—Example Relationships Between Data Models and Components Thereof

As explained in Example 1, disclosed technologies relate to grouping at least some features used by a machine learning model (e.g., the features 110 used with the machine learning model 120 of FIGS. 1 and 2). Grouping can be based, or based at least in part, on relationships between features. For example, at least some of the features 110 can be associated with a data model, such as a database used in a relational database system or other data store. In a particular example, data used for OLAP analysis can be stored in conjunction with an OLAP cube definition, where the cube definition can be defined with respect to data stored in a plurality of tables, such as tables in a star schema. Both the cube definition and the star schema can serve as data models from which relationships between features can be extracted and used in forming feature groups of disclosed technologies.

Figure 3:
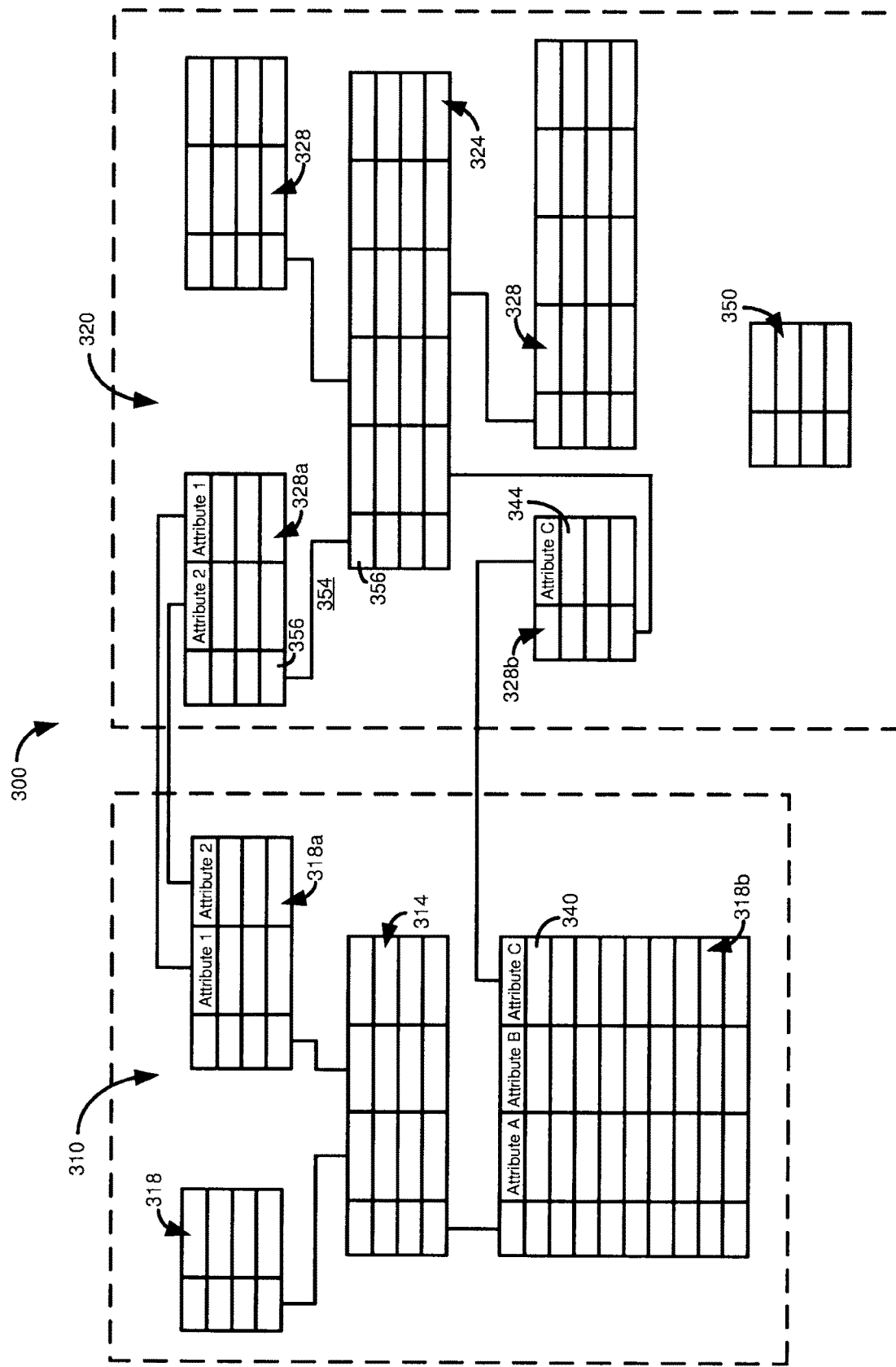
FIG. 3 is a diagram of a data model illustrating how multiple star schemas can be related.

FIG. 3 schematically depicts a data model 300 that includes two star schemas 310, 320. Star schema 310 includes a central fact table 314 and three dimension tables 318. Star schema 320 includes a central fact table 324 and four dimension tables 328.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 3, dimension table 318*a* is identical to dimension table 328*a* (other than, potentially, a record ID or other means of identifying tuples that does not convey substantive information). Or, rather than having duplicate tables, dimension table 318*a* and dimension table 328*a* can be the same table, but represented as members of multiple star schemas. Each attribute in the dimension tables 318*a*, 328*a* can serve as a pathway between facts in fact table 314 and facts in fact table 324. However, each of these pathways is different, in that different attributes are linked together. It can be important which attributes are used to link dimension tables 318*a* and 328*a*. For example, operations (e.g., specified by a SQL statement) to implement the pathways may be different. Additionally, some of the pathways may use indexed attributes, while others do not, which can affect the execution speed of a particular pathway.

In the example scenario of FIG. 3, an alternate way of obtaining facts from fact tables 314 and 324 is through the use of attribute 340 of dimension table 318*b* and attribute 344 of dimension table 328*b*.

Various information in the data model 300 can be used in determining which features (attributes of the tables in the star schemas 310, 320) may be placed into feature groups. In some cases, belonging to the data model 300 at all may suggest that the attributes in the data model 300 should be placed into a common feature group, or can be a factor considered in determining whether to place such attributes in a common feature group, or one of a number of feature groups. For example, if the attributes used in training or using a machine learning model come from a number of data sources, there could be significance in having attributes from the data model 300 be in a common feature group. Or, when assigning attributes from multiple data sources to feature groups, being part of the data model 300 can be a factor that weighs for or against including a given feature in a given feature group.

Membership in a subelement of the data model 300 (e.g., whether an attribute/feature is part of star schema 310 or 320, or in an individual table 314, 318, 324, 328 of a star schema) can be handled in an analogous manner. Thus, feature groups might be suggested for one of more of star schemas 310 or 320, or for one or more of tables 314, 318, 324, 328. Or, membership is such a star schema 310, 320 or a table 314, 318, 324, 328 might be a factor in determining whether a given attribute/feature of the data model 300 should be included in a given feature group, even if the feature group does not correspond to the data model or a unit (or element, such as a table, view, attribute, OLAP cube definition) of the data model.

Relationships between individual attributes in the data model 300 can also be used in determining feature groups to be formed, or evaluating features for membership in a feature group. For example, attributes of table 350 of star schema 320 might be considered for inclusion in a feature group for the star schema, or another feature group where membership in the star schema 320 is a positive factor. Tables 328*a* and 324 of star schema 320 might be evaluated in a similar manner as table 350. However, tables 328*a* and 324 might be considered for membership in another feature group given that they related by relationship 354 (which can be, for example, having one or more attributes in common, including in a foreign key relation, or an association).

When two or more tables are related, feature groups or feature group membership can be suggested based on the tables that are related, attributes that are related, or a combination thereof. For example, relationship 354 might be used to suggest that all attributes of tables 324, 328 should be part of a feature group, or used to evaluate possible feature group membership. Or, only the attributes 356 directly linked by the relationship 354 might be evaluated in this way. Or, one of the attributes 356 and its associated table 324, 328 might be evaluated in this way, but only the linked attribute of the other table considered for inclusion in a given feature group.

Example 4—Example Relationships Between Tables in a Data Model

Figure 4:
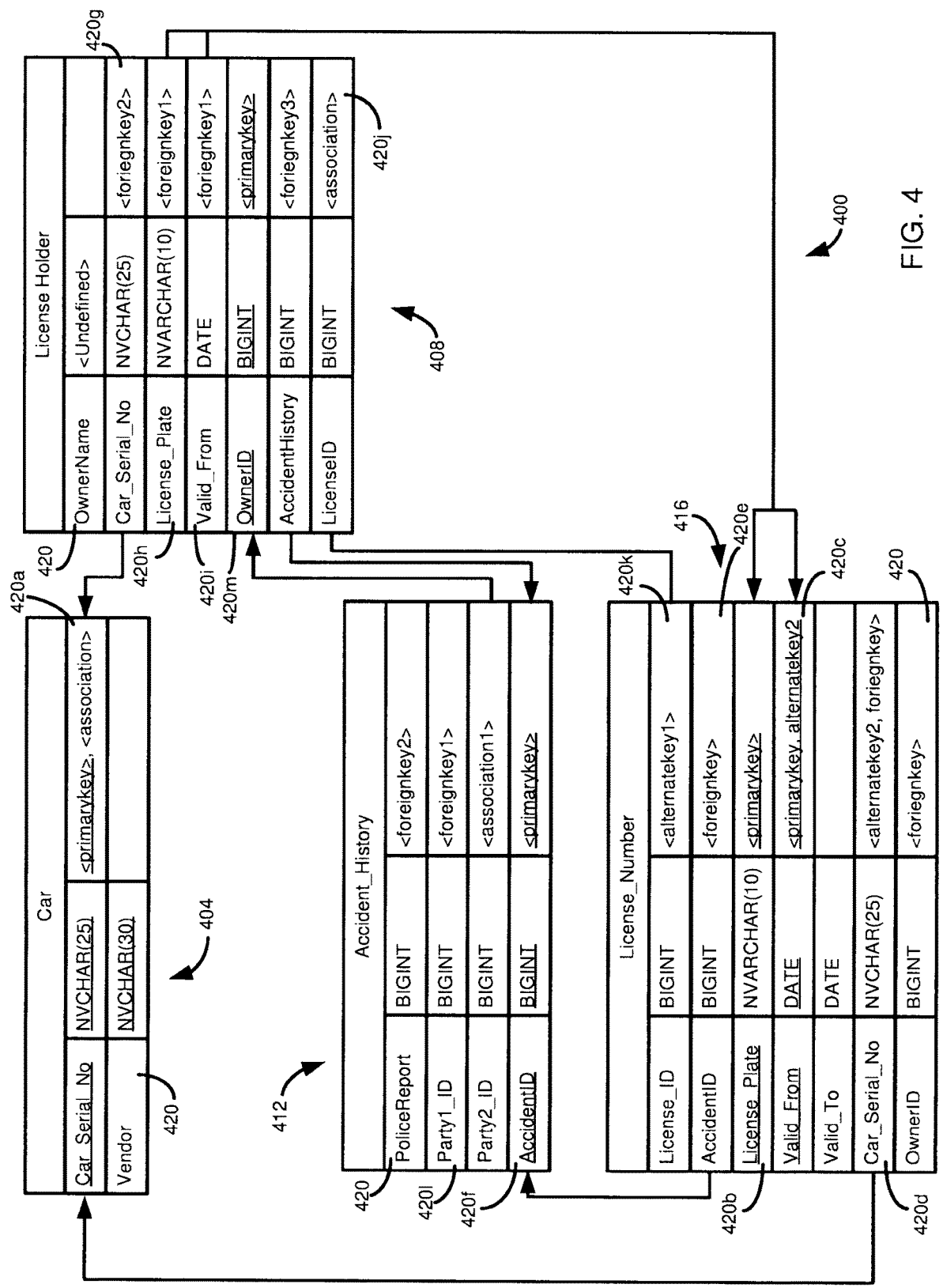
FIG. 4 is a diagram of a database schema showing relationships between at least a portion of database tables in the schema.

FIG. 4 provides additional details regarding how attributes of different tables can be related, and how those relationships can be used to define feature groups or evaluate potential membership in a feature groups. FIG. 4 illustrates a table 404 representing a car, a table 408 representing a license holder (e.g., a driver having a driver's license), a table 412 providing an accident history, and a table 416 representing a license number (e.g., associated with a license plate).

Each of the tables 404, 408, 412, 416 has a plurality of attributes 420 (although, a table may only have one attribute in some circumstances). For a particular table 404, 408, 412, 416, one or more of the attributes 420 can serve as a primary key—uniquely identifying particular records in the tuple and being designated as the main method of accessing tuples in the table. For example, in the table 404, the Car_Serial_No attribute 420*a* serves as the primary key. In the table 416, the combination of attributes 420*b* and 420*c* together serve as the primary key.

A table can reference records associated with the primary key of another table through the use of a foreign key. For example, the license number table 416 has an attribute 420*d* for a Car_Serial_No in table 416 that is a foreign key and is associated with the corresponding attribute 420*a* of table 404. The use of a foreign key can serve various purposes. The foreign key can link particular tuples in different tables. For example, a foreign key value of 8888 for the attribute 420*d* would be associated with a particular tuple in table 404 having that value for attribute 420*a*. Foreign keys can also act as constraints, where a record cannot be created having (or altered to have) a foreign key value that does not exist as a primary key value in the referenced table. Foreign keys can also be used to maintain database consistency, where a change to a primary key value can be propagated to table where the attribute is a foreign key.

A table can have other attributes, or combinations of attributes, that can serve to uniquely identify tuples, but which are not primary keys. Table 416, for instance, has an alternate key that is formed from attribute 420*c* and attribute 420*d*. Thus, a unique tuple can be accessed in the table 416 using either the primary key (e.g., being a foreign key in another table) or through an association to the alternate key.

In the scenario of FIG. 4, it can be seen that multiple pathways exist between tables. For example, consider an operation that is to collect data from table 416 and table 408. One pathway is to move from table 416 to table 412 using the foreign key 420*e*. Then, table 408 can be reached through the foreign key relationship of attribute 420*l* of table 412 to the primary key 420*m* of table 408. Alternatively, table 408 can be reached from table 416 through table 404, since table 416 has an attribute 420*d* that serves as a foreign key for the primary key 420a of table 404, and attribute 420 is also an associate to the alternate key of attribute 420g of table 408.

In the above scenario, both paths have the same length, but link to different attributes of table 412. The scenario of FIG. 4 is relatively simple, so it can be seen that as the number of tables in a data model increases, the number of possible paths can increase greatly. In addition, even between two tables, multiple, different pathways can exist. For example, table 408 can access tuples of table 416 through the foreign key attributes 420h, 420i of table 408, accessing primary key attributes 420b, 420c of table 416, or using the association provided by attribute 420j of table 416 which references attribute 420k, an alternate key of table 416. Although the ultimate path is different, table 408 to table 416, the paths are different in that different attributes 420 are connected.

If the tables 404, 408, 412, 416 were represented in a graph, each table may be a node. Paths between tables 404, 408, 412, 416 can be edges, which can be unidirectional or bidirectional. However, different paths between tables form different edges. Again using the path between tables 408 and table 416 as an example, the path through the foreign key attributes 420h, 420i is a different edge than the path through the association attribute 420j.

In a similar manner as described in Example 4, the tables 404, 408, 412, 416 can be used to suggest and populate feature groups. Similarly, foreign key, associations, or other relationships between tables (e.g., use defining view, triggers, use in common SQL statements), including individual attributes thereof) can be used to suggest or populate feature groups. In addition to using the existence of relationships between tables to suggest or populate feature groups, the number, type, or directionality of relationships between tables can be considered, such as having foreign key relationships be weighted more heavily in determining membership in feature groups.

Example 5—Example Relationship Between Elements of a Database Schema

In some cases, data model information can be stored in a data dictionary or similar repository, such as an information schema. An information schema can store information defining an overall data model or schema, tables in the schema, attributes in the tables, and relationships between tables and attributes thereof. However, data model information can include additional types of information, as shown in FIG. 5.

Figure 5:
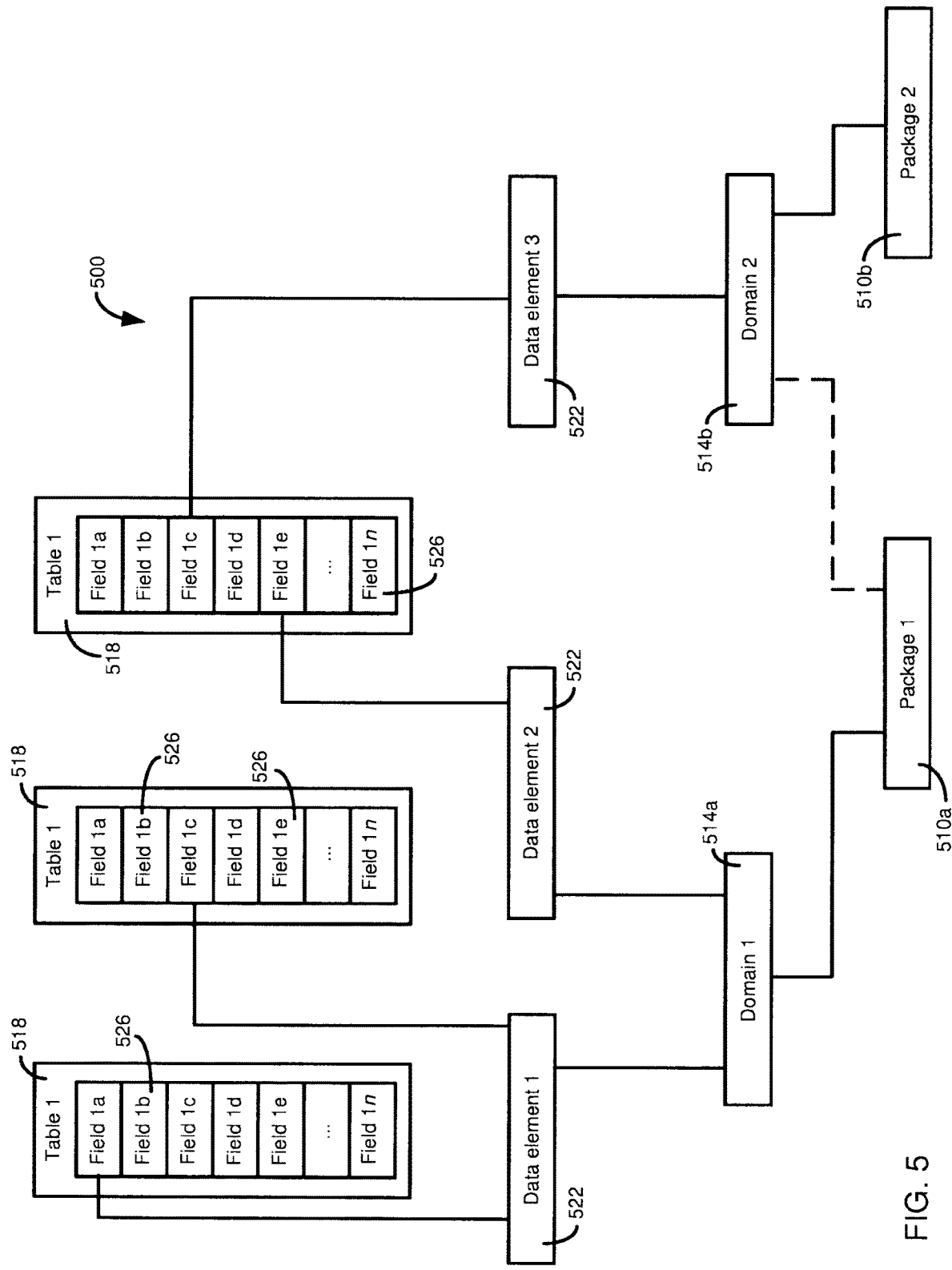
FIG. 5 is a schematic diagram illustrating relationships between table elements that can be included in a data dictionary, or otherwise used to define database tables.

FIG. 5 is a diagram illustrating elements of a database schema 500 and how they can be interrelated. These interrelationships can be used to define feature groups, or in evaluating membership in feature groups. In at least some cases, the database schema 500 can be maintained other than at the database layer of a database system. That is, for example, the database schema 500 can be independent of the underlying database, including a schema used for the underlying database. Typically, the database schema 500 is mapped to a schema of the database layer (e.g., schema 400 of FIG. 4), such that records, or portions thereof (e.g., particular values of particular fields) can be retrieved through the database schema 500.

The database schema 500 can include one or more packages 510. A package 510 can represent an organizational component used to categorize or classify other elements of the schema 500. For example, the package 510 can be replicated or deployed to various database systems. The package 510 can also be used to enforce security restrictions, such as by restricting access of particular users or particular applications to particular schema elements. A package 510 can be used to define a feature group. Or, if attributes are members of a given package 510, that may make it more or less likely that they should be included in another feature group.

A package 510 can be associated with one or more domains 514 (i.e., a particular type of semantic identifier or semantic information). In turn, a domain 514 can be associated with one or more packages 510. For instance, domain 1, 514a, is associated only with package 510a, while domain 2, 514b, is associated with package 510a and package 510b. In at least some cases, a domain 514 can specify which packages 510 may use the domain. For instance, it may be that a domain 514 associated with materials used in a manufacturing process can be used by a process-control application, but not by a human resources application.

In at least some implementations, although multiple packages 510 can access a domain 514 (and database objects that incorporate the domain), a domain (and optionally other database objects, such as tables 518, data elements 522, and fields 526, described in more detail below) is primarily assigned to one package. Assigning a domain 514, and other database objects, to a unique package can help create logical (or semantic) relationships between database objects. In FIG. 5, an assignment of a domain 514 to a package 510 is shown as a solid line, while an access permission is shown as a dashed line. So, domain 514a is assigned to package 510a, and domain 514b is assigned to package 510b. Package 510a can access domain 514b, but package 510b cannot access domain 514a.

Note that at least certain database objects, such as tables 518, can include database objects that are associated with multiple packages. For example, a table 518, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 514 (that is, the domains can provide further semantic context for database objects that are associated with an object of another package, rather than being assigned to a common package).

As will be explained in more detail, a domain 514 can represent the most granular unit from which database tables 518 or other schema elements or objects can be constructed. For instance, a domain 514 may at least be associated with a datatype. Each domain 514 is associated with a unique name or identifier, and is typically associated with a description, such as a human readable textual description (or an identifier than can be correlated with a human readable textual description) providing the semantic meaning of the domain. For instance, one domain 514 can be an integer value representing a phone number, while another domain can be an integer value representing a part number, while yet another integer domain may represent a social security number. The domain 514 thus can held provide common and consistent use (e.g., semantic meaning) across the schema 500. That is, for example, whenever a domain representing a social security number is used, the corresponding fields can be recognized as having this meaning even if the fields or data elements have different identifiers or other characteristics for different tables.

As domains 514 can be used to help provided common and consistent semantic meaning, they can be useful in defining feature groups. Or, domains 514 can be useful in deciding whether an attribute that is associated with the domain should be part of a given feature group, where the feature group is not defined based entirely on the domain.

The schema 500 can include one or more data elements 522. Each data element 522 is typically associated with a single domain 514. However, multiple data elements 522 can be associated with a particular domain 514. Although not shown, multiple elements of a table 518 can be associated with the same data element 522, or can be associated with different data elements having the same domain 514. Data elements 522 can serve, among other things, to allow a domain 514 to be customized for a particular table 518. Thus, the data elements 522 can provide additional semantic information for an element of a table 518.

Tables 518 include one or more fields 526, at least a portion of which are mapped to data elements 522. The fields 526 can be mapped to a schema of a database layer, or the tables 518 can be mapped to a database layer in another manner. In any case, in some embodiments, the fields 526 are mapped to a database layer in some manner Or, a database schema can include semantic information equivalent to elements of the schema 500, including the domains 514.

In some embodiments, one or more of the fields 526 are not mapped to a domain 514. For example, the fields 526 can be associated with primitive data components (e.g., primitive datatypes, such as integers, strings, Boolean values, character arrays, etc.), where the primitive data components do not include semantic information. Or, a database system can include one or more tables 518 that do not include any fields 526 that are associated with a domain 514. However, the disclosed technologies include a schema 500 (which can be separate from, or incorporated into, a database schema) that includes a plurality of tables 518 having at least one field 526 that is associated with a domain 514, directly or through a data element 522.

Because data elements 522 can indicate common or related attributes, they can be useful in defining feature groups, or for evaluating membership in feature groups, such as described for the domains 514 and packages 510.

Example 6—Example Data Dictionary

Schema information, such as information associated with the schema 500 of FIG. 5, can be stored in a repository, such as a data dictionary. As discussed, in at least some cases the data dictionary is independent of, but mapped to, an underlying relational database. Such independence can allow the same database schema 500 to be mapped to different underlying databases (e.g., databases using software from different vendors, or different software versions or products from the same vendor). The data dictionary can be persisted, such as being maintained in a stored tables, and can be maintained in memory, either in whole or part. An in-memory version of a data dictionary can be referred to as a dictionary buffer.

Figure 6:
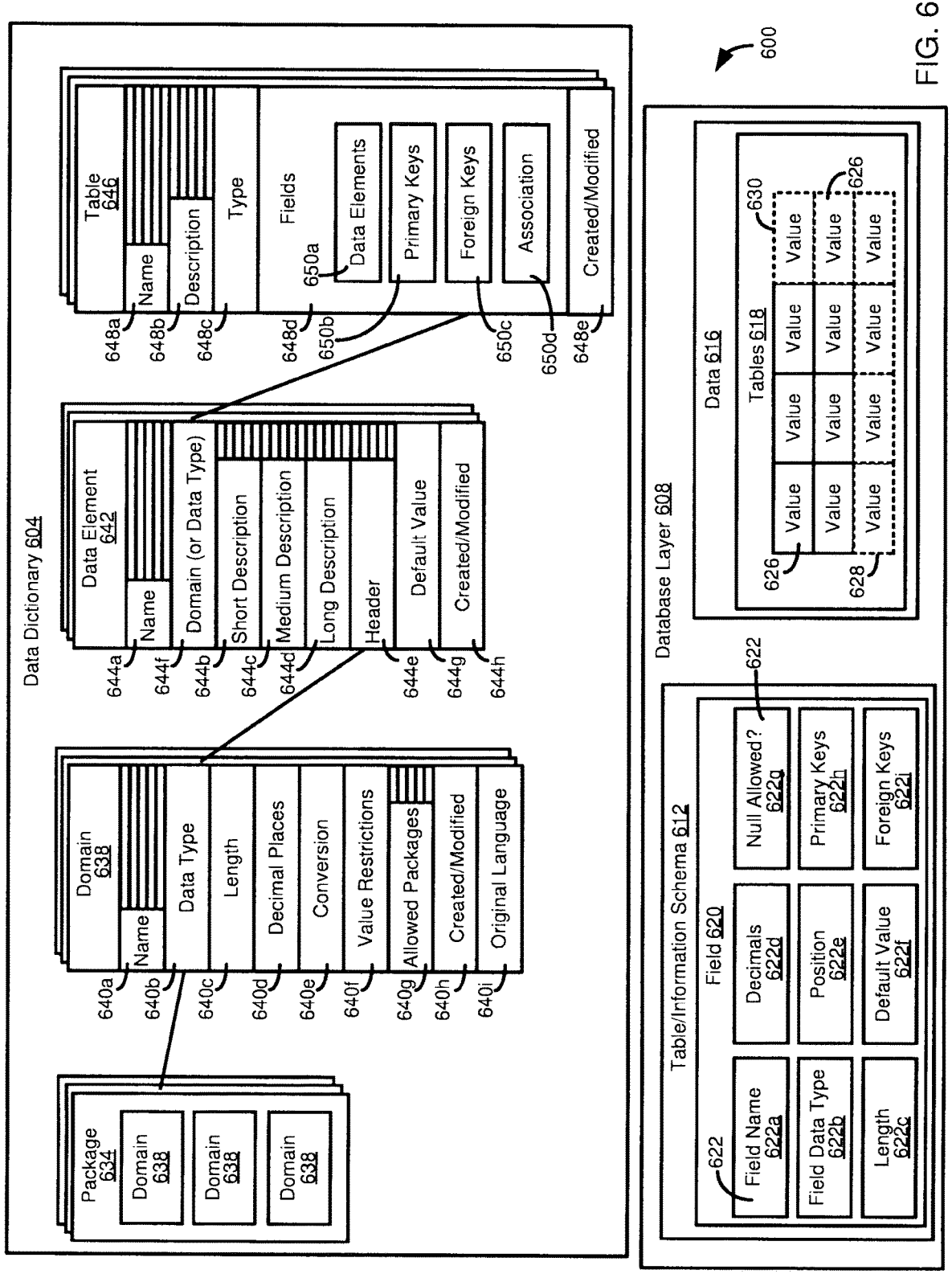
FIG. 6 is a schematic diagram illustrating components of a data dictionary and components of a database layer.

FIG. 6 illustrates a database environment 600 having a data dictionary 604 that can access, such as through a mapping, a database layer 608. The database layer 608 can include a schema 612 (e.g., an INFORMATION_SCHEMA as in PostgreSQL) and data 616, such as data associated with tables 618. The schema 612 includes various technical data items/components 622, which can be associated with a field 620, such as a field name 622a (which may or may not correspond to a readily human-understandable description of the purpose of the field, or otherwise explicitly describe the semantic meaning of values for that field), a field data type 622b (e.g., integer, varchar, string, Boolean), a length 622c (e.g., the size of a number, the length of a string, etc., allowed for values in the field), a number of decimal places 622d (optionally, for suitable datatypes, such as, for a float with length 6, specifying whether the values represent XX.XXXX or XXX.XXX), a position 622e (e.g., a position in the table where the field should be displayed, such as being the first displayed field, the second displayed field, etc.), optionally, a default value 622f (e.g., "NULL," "0," or some other value), a NULL flag 622g indicating whether NULL values are allowed for the field, a primary key flag 622h indicating whether the field is, or is used in, a primary key for the table, and a foreign key element 622i, which can indicate whether the field 620 is associated with a primary key of another table, and, optionally, an identifier of the table/field referenced by the foreign key element. A particular schema 612 can include more, fewer, or different technical data items 622 than shown in FIG. 6.

All or a portion of the technical data items 622 can be used in defining feature groups or evaluating features for membership in a feature group. In particular, the foreign key element 622i can be used to identify other tables (and specific attributes thereof) that might be related to a given field, where either the other table or field might be considered for membership in a feature group.

The tables 618 are associated with one or more values 626. The values 626 are typically associated with a field 620 defined using one or more of the technical data elements 622. That is, each row 628 typically represents a unique tuple or record, and each column 630 is typically associated with a definition of a particular field 620. A table 618 typically is defined as a collection of the fields 620, and is given a unique identifier.

The data dictionary 604 includes one or more packages 634, one or more domains 638, one or more data elements 642, and one or more tables 646, which can at least generally correspond to the similarly titled components 510, 514, 522, 518, respectively, of FIG. 5. As explained in the discussion of FIG. 5, a package 634 includes one or more (typically a plurality) of domains 638. Each domain 638 is defined by a plurality of domain elements 640. The domain elements 640 can include one or more names 640a. The names 640a serve to identify, in some cases uniquely, a particular domain 638. A domain 638 includes at least one unique name 640a, and may include one or more names that may or may not be unique. Names which may or may not be unique can include versions of a name, or a description, of the domain 638 at various lengths or levels of detail. For instance, names 640a can include text that can be used as a label for the domain 638, and can include short, medium, and long versions, as well as text that can be specified as a heading. Or, the names 640a can include a primary name or identifier and a short description or field label that provides human understandable semantics for the domain 638.

In at least some cases, the data dictionary 604 can store at least a portion of the names 640a in multiple languages, such as having domain labels available for multiple languages. In embodiments of the disclosed technologies, when domain information is used for identifying relationships between tables or other database elements or objects, including searching for particular values, information, such as names 640a, in multiple languages can be searched. For instance, if "customer" is specified, the German and French portion of the names 640a can be searched as well as an English version.

The domain elements 640 can also include information that is at least similar to information that can be included in the schema 612. For example, the domain elements 640 can include a data type 640b, a length 640c, and a number of decimal places 640d associated with relevant data types, which can correspond to the technical data elements 622b, 622c, 622d, respectively. The domain elements 640 can include conversion information 640e. The conversion information 640e can be used to convert (or interconvert) values entered for the domain 638 (including, optionally, as modified by a data element 642). For instance, conversion information 640 can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 638 can be stored in a repository, such as a field catalog.

The domain elements 640 can include one or more value restrictions 640f. A value restriction 640f can specify, for example, that negative values are or are not allowed, or particular ranges or threshold of values that are acceptable for a domain 638. In some cases, an error message or similar indication can be provided as a value is attempted to be used with a domain 638 that does not comply with a value restriction 640f. A domain element 640g can specify one or more packages 634 that are allowed to use the domain 638.

A domain element 640h can specify metadata that records creation or modification events associated with a domain element 638. For instance, the domain element 640h can record the identity of a user or application that last modified the domain element 640h, and a time that the modification occurred. In some cases, the domain element 640h stores a larger history, including a complete history, of creation and modification of a domain 638.

A domain element 640i can specify an original language associated with a domain 638, including the names 640a. The domain element 640i can be useful, for example, when it is to be determined whether the names 640a should be converted to another language, or how such conversion should be accomplished.

Data elements 642 can include data element fields 644, at least some of which can be at least generally similar to domain elements 640. For example, a data element field 644a can correspond to at least a portion of the name domain element 640a, such as being (or including) a unique identifier of a particular data element 642. The field label information described with respect to the name domain element 640a is shown as separated into a short description label 644b, a medium description label 644c, a long description label 644d, and a header description 644e. As described for the name domain element 640a, the labels and header 644b-644e can be maintained in one language or in multiple languages.

A data element field 644f can specify a domain 638 that is used with the data element 642, thus incorporating the features of the domain elements 640 into the data element. Data element field 644g can represent a default value for the data element 642, and can be at least analogous to the default value 622f of the schema 612. A created/modified data element field 644h can be at least generally similar to the domain element 640h.

Tables 646 can include one or more table elements 648. At least a portion of the table elements 648 can be at least similar to domain elements 640, such as table element 648a being at least generally similar to domain element 640a, or data element field 644a. A description table element 648b can be analogous to the description and header labels described in conjunction with the domain element 640a, or the labels and header data element fields 644b-644e. A table 646 can be associated with a type using table element 648c.

Example table types include transparent tables, cluster tables, and pooled tables, such as used as in database products available from SAP SE of Walldorf, Germany.

Tables 646 can include one or more field table elements 648d. A field table element 648d can define a particular field of a particular database table. Each field table element 648d can include an identifier 650a of a particular data element 642 used for the field. Identifiers 650b-650d, can specify whether the field is, or is part of, a primary key for the table (identifier 650b), or has a relationship with one or more fields of another database table, such as being a foreign key (identifier 650c) or an association (identifier 650d).

A created/modified table element 648e can be at least generally similar to the domain element 640h.

Packages 634, domains 638, and data element 642, and particular components thereof (e.g., components 640, 644) can be used in defining feature groups or evaluating attributes for membership in feature groups, such as described in Example 5. Similarly, tables 646, and elements thereof (particularly the type 648c, primary keys 650b, foreign keys 650c, and associations 650d), can be used in defining feature groups or evaluating attributes for membership in feature groups. For example, features having a common value for the original language domain element 640i might be suggested as forming a feature group, or being more or less likely to be included in another feature group.

Example 7—Example Relationships Between Database Objects Based on Data Access Operations Requests for data can also be used to identify feature groups, or to evaluate features for membership in a feature group. As an example, a data request, such as specified in a query language statement, can be used in identifying feature groups and their constituent features.

Figure 7:
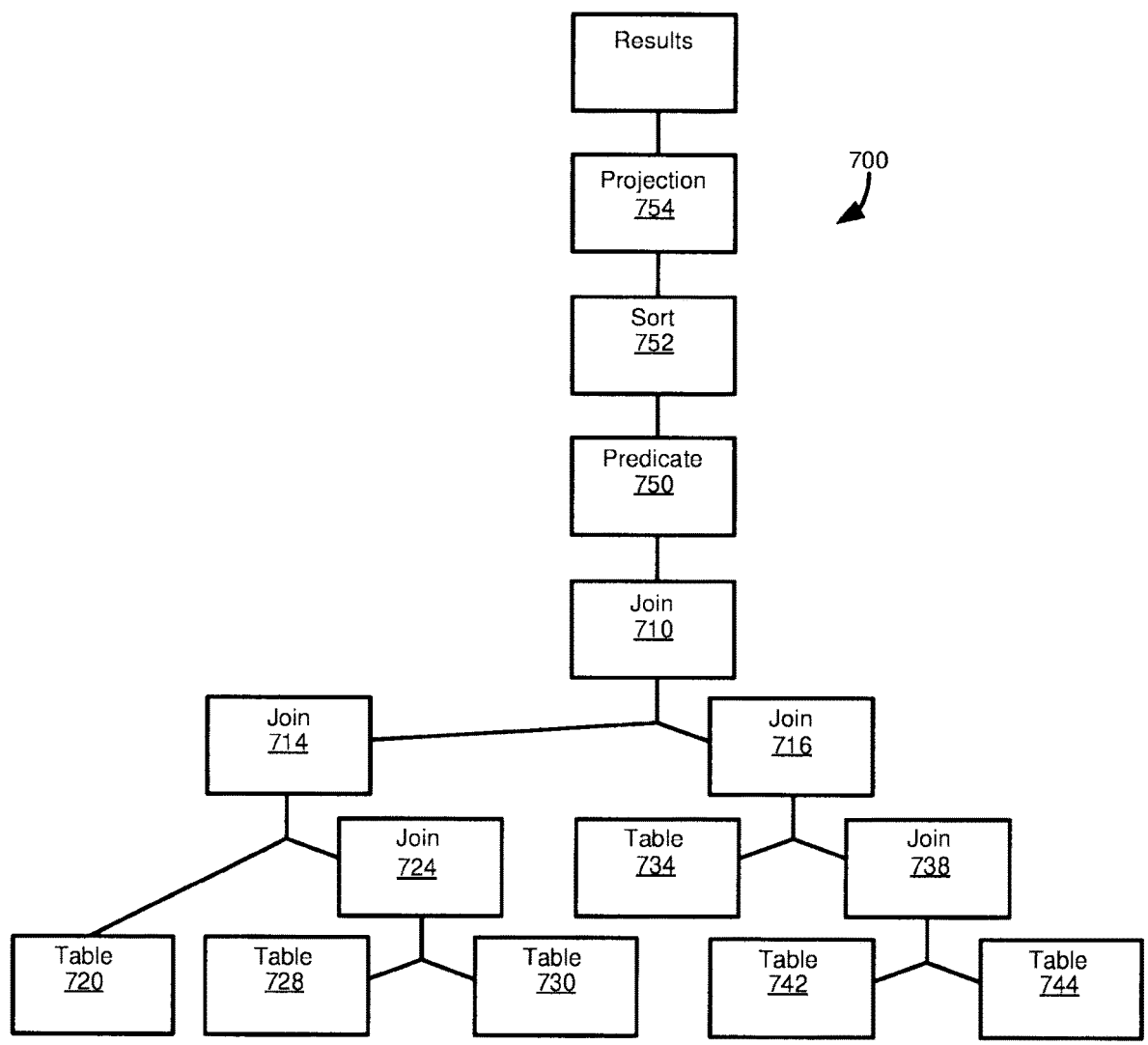
FIG. 7 presents example data access operations that provide query results by accessing, and processing, data from a plurality of data sources, including operations that join results from multiple tables.

FIG. 7 illustrates an example logical query plan 700 for a query that involves multiple query operations, including several join operations. In some cases, the overall query plan 700 can identify a possible feature group, or be used for evaluating membership in a feature group. For example, features for a machine learning model can come from one or more sources in addition to data associated with the query plan 700. Thus, in some cases, features from the query plan 700 may be related, including in terms of their contribution to/ability to predict an outcome of a machine learning model.

Additional feature groups, or membership evaluation criteria, can be suggested by one or more operations within the query plan 700. For example, a join operation may indicate a possible feature group, or membership evaluation criteria, with at least some of the features of data sources associated with the join being included, or considered for inclusion, in such feature group.

The query plan 700 includes a join 710 that joins results of joins 714, 716. Join 714 itself joins results from a table 720 and a join 724 of tables 728, 730. Similarly, join 716 includes results of a table 734 and of a join 738 of tables 742, 744.

At each level of the query plan 700, the join operations may suggest feature groups, or criteria that can be used in evaluating membership in a feature group. For example, a feature group or membership criteria can be defined with reference to join 714, which can then include features associated with tables 720, 728, 730. Similarly, a feature group or membership criteria can be defined with reference to join 716, including features associated with tables 734, 742, 744.

Moving lower in the query plan 700, feature groups or membership criteria can be defined based on join 724 (tables 728, 730) or join 738 (tables 742, 744). Individual data sources, tables 720, 728, 730, 734, 742, 744 can also be considered as possible feature groups, or membership criteria.

Each join 710, 714, 716, 724, 738 includes one or more join conditions. A join condition can be a relationship between a feature of one table or intermediate results (e.g., the results of another join) and a feature of another table or intermediate results. A join can also include filter conditions (e.g., predicates) and other operations that are defined with respect to features of one or more of the data sources being joined. One or more features included in the join conditions can be considered as defining a feature group or being used at least in part to evaluate membership in a feature group.

Similarly, the query plan 700 can include operations in addition to the joins 710, 714, 716, 724, 738. These operations can include a predicate 750 (e.g., a filter condition), a sort operation 752 (e.g., sort ascending), and a projection operation 754 (e.g., selecting particular fields of results returned by earlier operations). These operations 750, 752, 754, including specific features used in the operations (for example, a field that is evaluating using the predicate or used for sorting), can be used to define feature groups or as membership criteria. As an example, tables 720, 728, 730, 734, 742, 744 may all have a feature (e.g., attribute/field/column) used in the projection 754, which feature/the projection can be defined as a feature group, or used for evaluating membership in a feature group.

Example 8—Example Relationships Between Features

In some embodiments, feature groups can be determined by evaluating relationships between features. These relationships can be determined by various techniques, including using various statistical techniques. One technique involves determining mutual information for pairs of features, which identifies the dependence of the features on one another. However, other types of relationship information can be used to identify related features, as can various clustering techniques.

Figure 8:
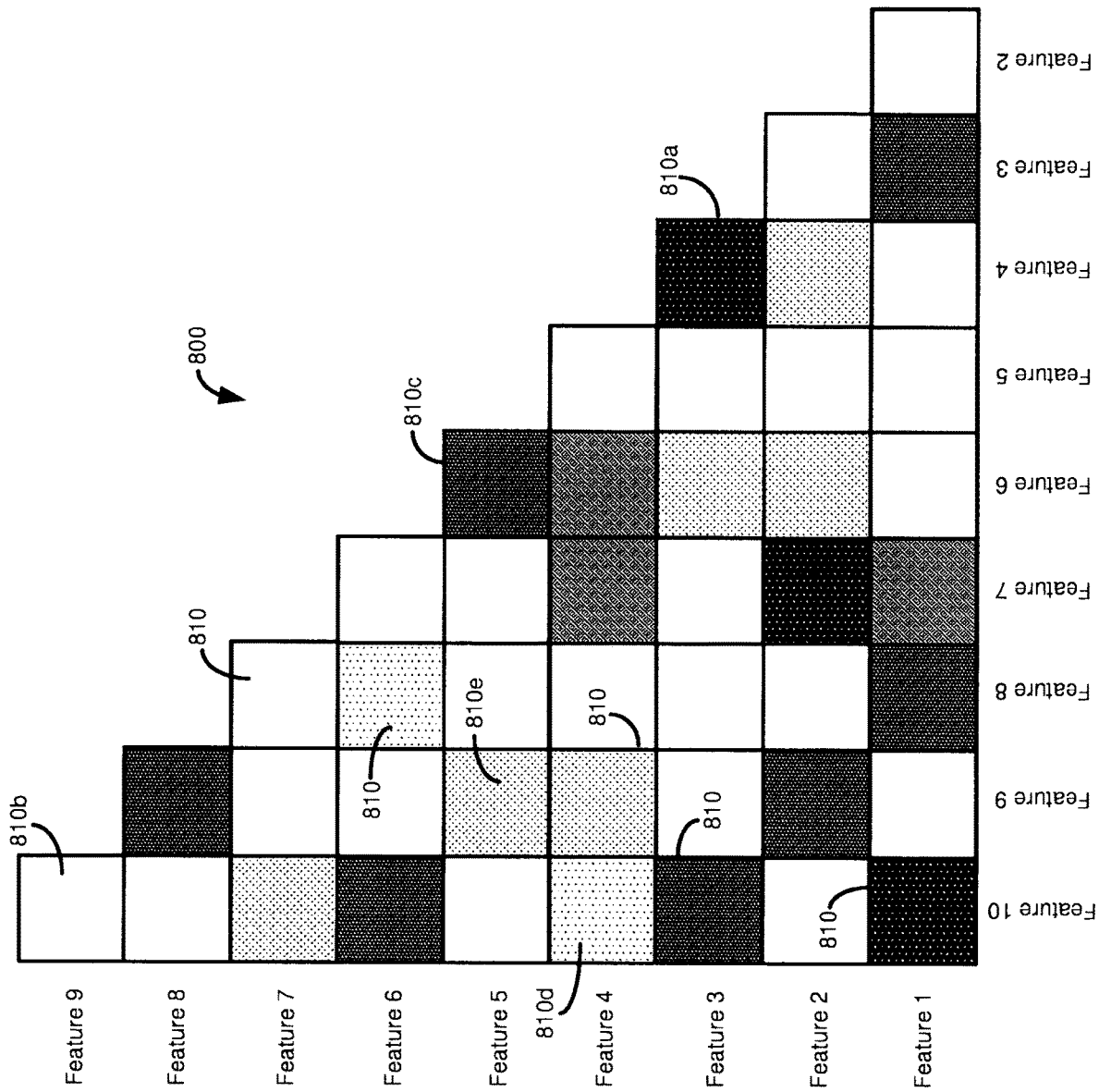
FIG. 8 is matrix illustrating dependency information between features used as input for a machine learning model.

FIG. 8 illustrates a plot 800 (e.g., a matrix) of mutual information for ten features. Each square 810 represents the mutual information, or correlation or dependence, for a pair of different features. For example, square 810a reflects the dependence between feature 3 and feature 4. The squares 810 can be associated with discrete numerical values indicating any dependence between the variables, or the values can be binned, including to provide a heat map of dependencies.

As shown, the plot 800 shows the squares 810 with different fill patterns, where a fill pattern indicates a dependency strength between the pair of features. For example, greater dependencies can be indicated by darker fill values. Thus, square 810a can indicate a strong correlation or dependency, square 810b can indicate little or no dependency between the features, and squares 810c, 810d, 810e can indicate intermediate levels of dependency.

Dependency information can be used to define feature groups, and used to determine membership in feature groups. For example, features having a dependency, at least within a given threshold, on other features can be considered as part of a common feature group. With reference to the plot 800, it can be seen that feature 10 has dependencies, to varying degrees, on features 1, 3, 4, 6, 7. Thus, features 1, 3, 4, 6, 7, and 10 could be defined as a feature group. Or, feature 4 could be excluded, if a threshold was set such that feature 4 did not satisfy the interrelationship threshold. In other embodiments, features having at least a threshold dependence on features 3, 4, 5, 6, 7 could be added to the feature group associated with feature 10.

Various criteria can be defined for suggesting feature groups, including a minimum or maximum number of feature groups, or a minimum or maximum number of features within a feature group. Similarly, thresholds can be set for features that are considered for possible inclusion in a feature group (where features that do not satisfy the threshold for any other feature can be omitted from the plot 800, for example). Thresholds can also be set for feature dependencies that will qualify for membership in a feature group (that is, if the dependency of feature 1 on feature 2 satisfies a threshold, feature 1 or feature 2 may be included in a feature group that is not necessarily defined based on dependencies to feature 1 or feature 2).

In some cases, feature groups identified using correlation/mutual dependency can be manually adjusted before or after identification. For example, prior to determining feature groups, a user can specify that certain features must be considered in determining feature groups, or are to be excluded from determining feature groups. Or, feature groups can be defined that include one or more features, and mutual information can be used to populate the group. The user can be presented with information (such as the plot 800) in order to evaluate whether any manual selections were correct. For example, a dependency value may indicate that a user's manual assignment of a feature group was incorrect. A user can manually adjust feature groups/features used in determining feature groups after being presented with the plot 800 or otherwise having mutual information available, such as adding a feature that the user believes should be in a feature group to the feature group even if the dependency information does not indicate that the feature should be in the feature group.

Various methods of determining correlation can be used, such as mutual information. Generally, mutual information can be defined as $I(X; Y) = D_{KL}(P_{X,Y} \| P_X \otimes P_Y)$, where X and Y are random variables having a joint distribution $P_{(X,Y)}$ and marginal distributions of $P_X$ and $P_Y$. Mutual information can include variations such as metric-based mutual information, conditional mutual information, multivariate mutual information, directed information, normalized mutual information, weighted mutual information, adjusted mutual information, absolute mutual information, and linear correlation. Mutual information can include calculating a Pearson's correlation, including using Pearson's chi-squared test, or using G-test statistics.

When used to evaluate a first feature with respect to a specified (target) second feature, supervised correlation can be used: $\text{scorr}(X,Y) = \text{corr}(\psi_X, \psi_Y)$, where scorr is Pearson's correlation and $\psi_X = \text{logit}(\hat{P}(Y|X)) - \text{logit}(\hat{P}(Y))$ (binary classification).

In some examples, dependence between two features can be calculated using a modified $X^2$ test:

$$\text{cell}(X = x, Y = y) = \frac{(O_{xy} - E_{xy}) \cdot |O_{xy} - E_{xy}|}{E_{xy}}$$

$$\text{Where: } E_{xy} = \frac{\sum_{i=1}^{I} O_{iy} \sum_{j=1}^{J} O_{xj}}{N}$$

$O_{xy}$ is the observed count of observations of X=x and Y=y, while $E_{xy}$ is the count that is expected if X and Y are independent.

Note that this test produces a signed value, where a positive value indicates that observed counts are higher than expected and a negative value indicates that observed counts are lower than expected.

Again, features that are dependent can be considered for inclusion in feature groups, or used to define feature groups. Dependencies between features can also be used to otherwise interpret results provided for a machine learning model, either for individual features or as part of an analysis that groups at least some features into feature groups.

In yet another implementation, interactions between features (which can be related to variability in SHAP values for a feature) can be calculated as:

$$logit(\hat{P}(Y|X_1, X_2, \ldots X_n)) = logit(\hat{P}(Y)) + \sum_{i,j} \phi_{ij}$$

Where $\phi_{ii}$ is the main SHAP contribution of feature i (excluding interactions) and $\phi_{ij}+\phi_{ji}$ is the contribution of the interaction between variables i and j with $\phi_{ij} \approx \phi_{ji}$. The strength of an interaction between features can be calculated as:

$$I_{ij} = 2 \frac{\sum |\phi_{ij}| + |\phi_{ji}|}{\sum |\phi_{ii}| + \sum |\phi_{jj}|}$$

Example 9—Example Display for Illustrating Relationships Between Features

Figure 9:
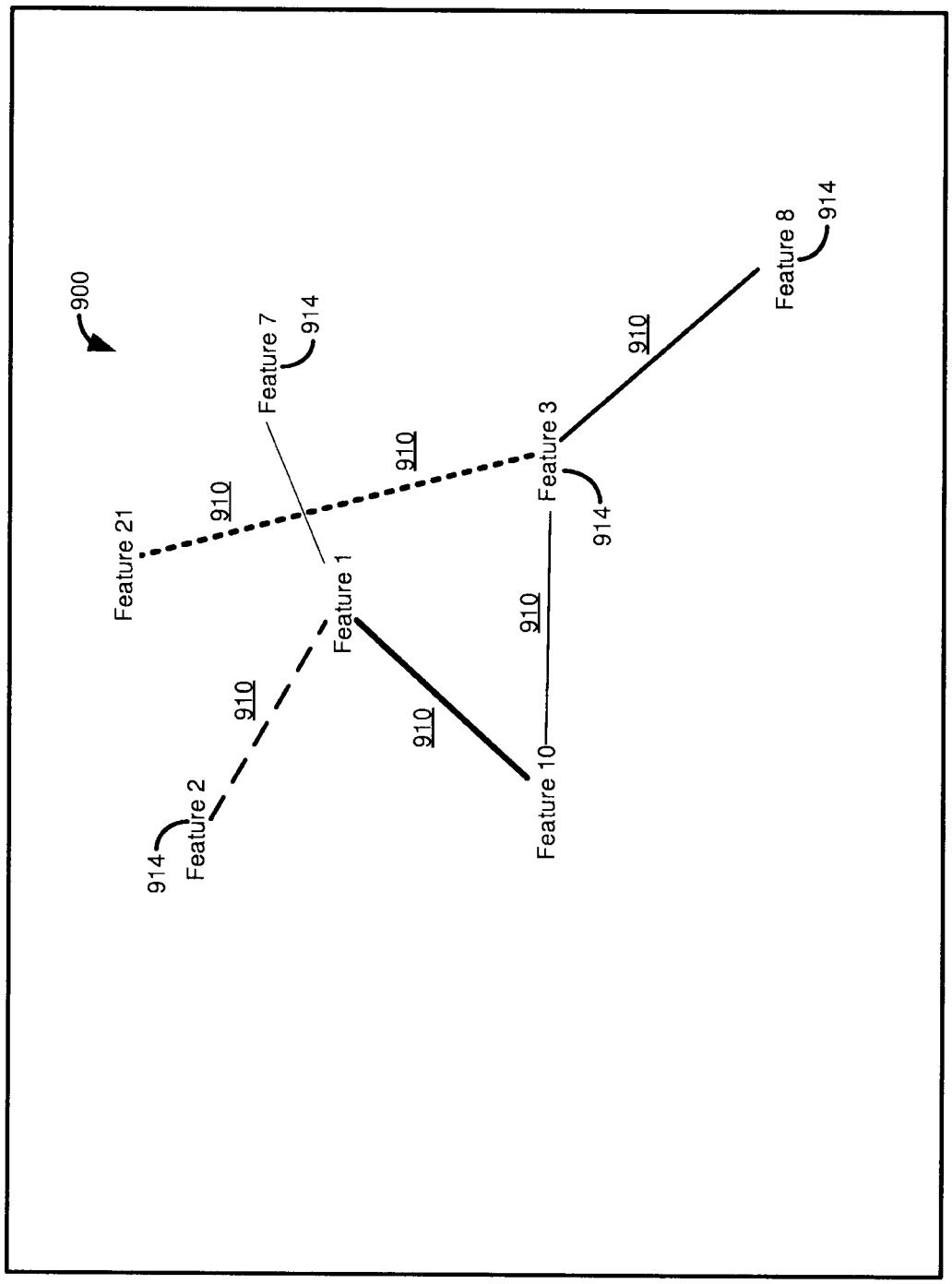
FIG. 9 is plot illustrating relationships between features used as input for a machine learning model.

Mutual information, or other types of dependency or correlation information, such as determined using techniques described in Example 8, can be presented to a user in different formats (or used without being presented to a user in a visual manner, such as simply providing feature groups resulting from the analysis). For example, FIG. 9 illustrates a plot 900 showing relationships 910 between features 914, which can be features for which the strength of the relationship satisfied a threshold.

The relationships 910 can be coded with information indicating the relative strength of the relationship. As shown, the relationships 910 are shown with different line weights and patterns, where various combinations of pattern/weight can be associated with different strengths (e.g., ranges or bins of strengths). For instance, more highly dashed lines can indicate weaker relationships for a given line weight, and increasingly heavy line weights can indicate stronger relationships/dependencies. In other cases, the relationships 910 can be displayed in different colors to indicate the strength of a relationships.

With the information in the plot 900 (and/or the plot 800) a user can adjust a feature group, such as by adding or removing feature groups. That is, plot 900 can represent an overall analysis for features used in a machine learning model, or a subset of such features. It could be that all of the features 914 should be included in a feature group. Or, a user may wish, for example, to change a threshold, such that features 914 with weaker relationships 910 are omitted from an updated version of the plot 900. Or, a user may wish to manually add features to a feature group that are not shown in the plot 900 (or, are not shown as linked by a relationship 910), or may wish to manually remove feature from a feature group.

In particular, it can be helpful for a user to evaluate mutual information results to confirm that the results make sense given the meaning of the different features. This can help ensure that relationships that would be expected are not omitted, and that features related by spurious relationships are not included in a feature group.

Example 10—Example Assignment of Features to Feature Groups

Figure 10:
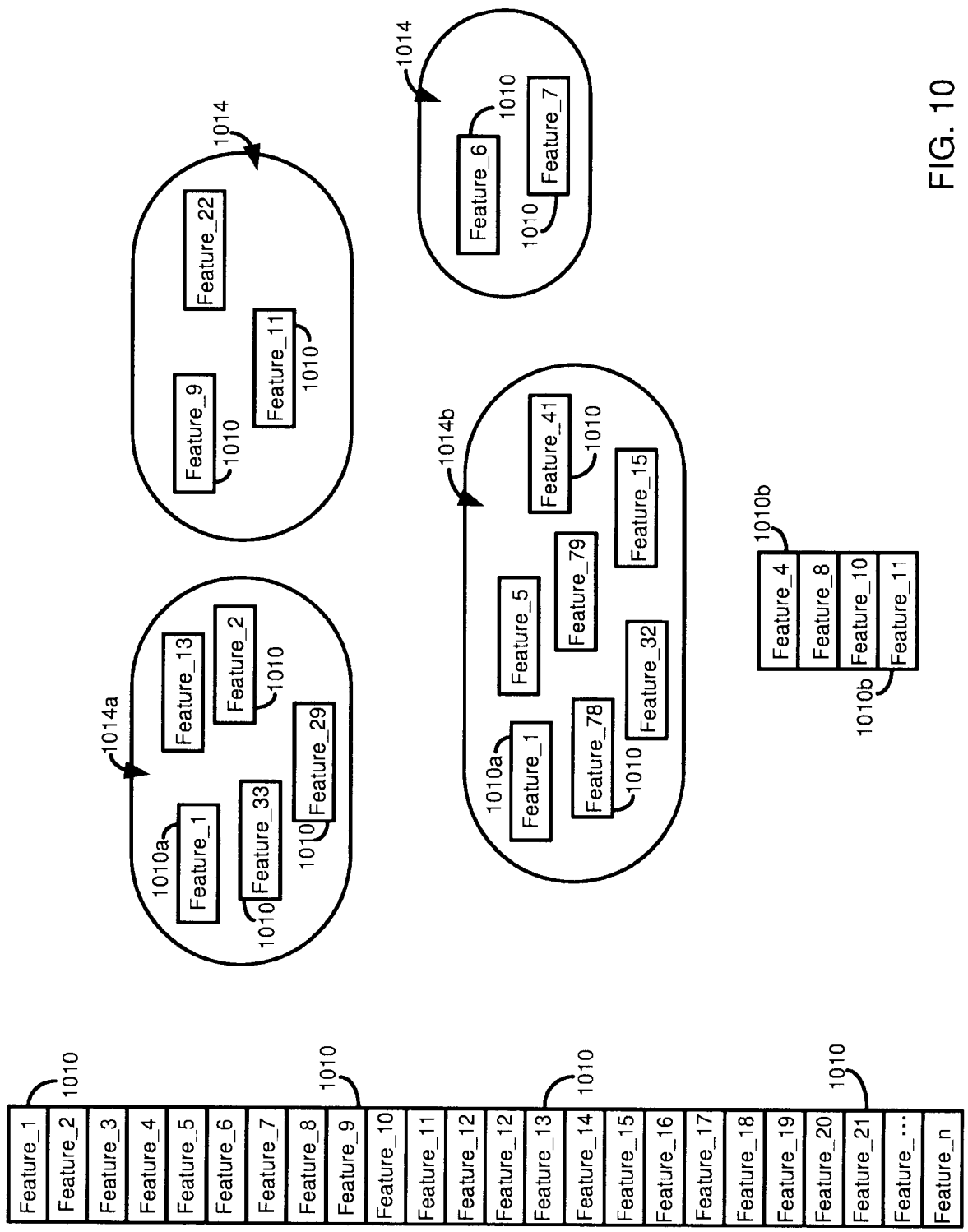
FIG. 10 is a diagram schematically illustrating how at least a portion of features used as input for a machine learning model can be assigned to feature groups.

FIG. 10 is a diagram illustrating how at least a portion of features 1010 (e.g., the features 110 of FIGS. 1 and 2) can be assigned to feature groups 1014, including based on one or more techniques described in Examples 1-9. It can be seen that the feature groups 1014 can include different numbers of features. Although not shown, it is possible for a feature group 1014 to include a single feature.

Typically, each feature 1010 is included in a single feature group 1014. However, in some cases, a given feature 1010 can be included in multiple feature groups 1014. For example, feature 1010a, Feature_1, is shown as a member of feature group 1014a and of 1014b. Although feature groups 1014 can have the same number of features 1010, typically feature groups 1014 are allowed to have different numbers of features, where the identity/number of features in a group is determined using user input, statistical methods, data relationships, other information, or combinations thereof, including as described in Examples 1-9.

In some cases, all features 1010 are assigned to feature groups 1014. However, one or more of the feature groups 1014 can simply be designated for "leftover" features that were not specifically assigned to another feature group. Or, as shown in FIG. 10, some of the features 1010, features 1010b, need not be assigned to feature groups 1014.

SHAP values for features can be aggregated, such as for a feature group, including as:

$$logit(\hat{P}(Y|X_1, X_2, \ldots X_n)) - logit(\hat{P}(Y)) = \sum_{i=1}^{n} \phi_i = \sum_{group} \sum_{j \in group} \phi_j$$

The relative importance of a feature group can be defined, in some implementations, as:

$$\text{Importance (group)} = \text{mean}\left(\left|\sum_{j \in group} \phi_j\right|\right)$$

Figure 11:
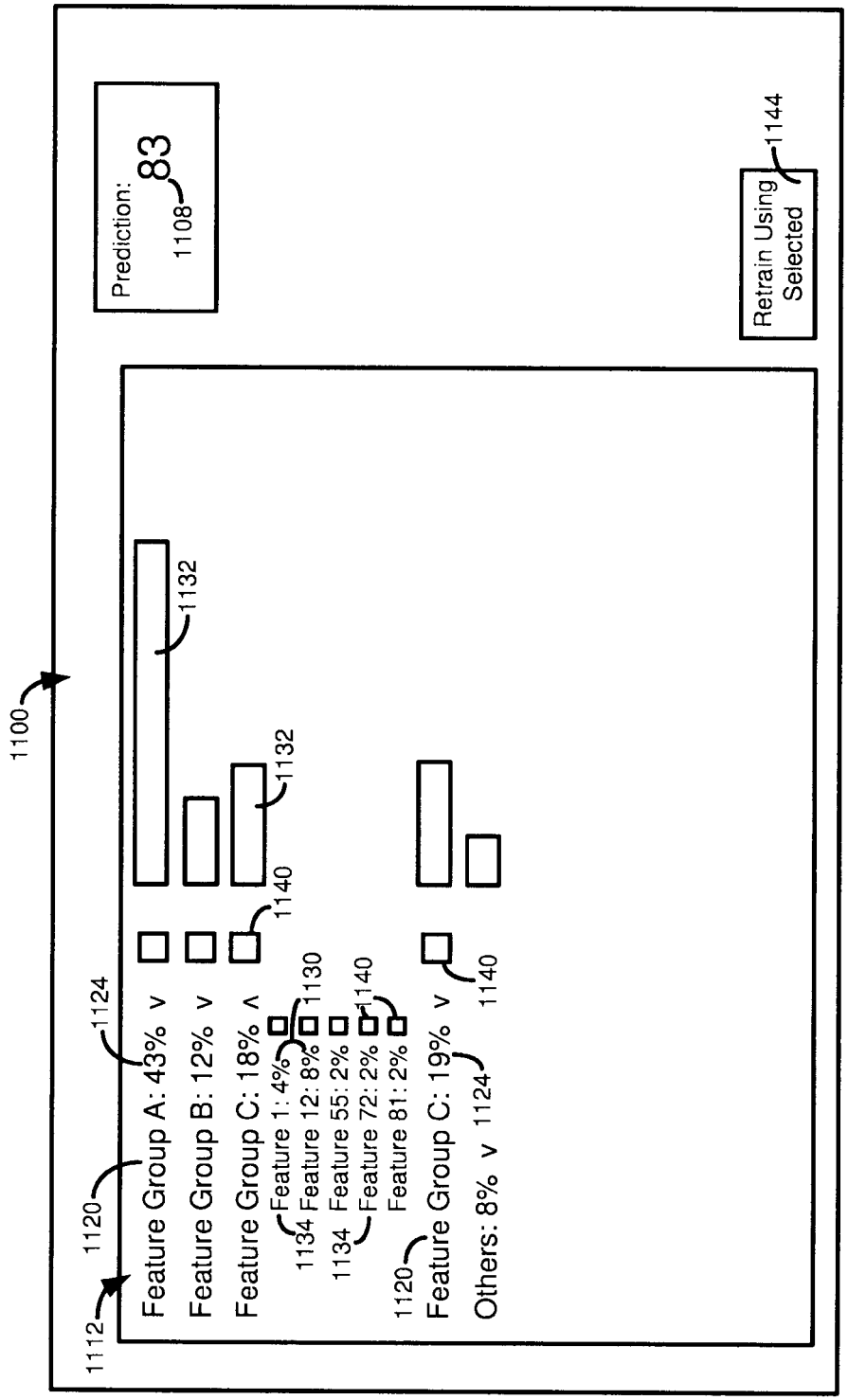
FIG. 11 is an example user interface screen presenting feature groups and their contributions to a result provided by a machine learning model.

Example 11—Example Display Screen Presenting Information Regarding Feature Groups FIG. 11 illustrates how feature groups can be used to provide information regarding how such feature groups contribute to a machine learning model, including to a particular result provided by a machine learning model for a particular set of feature input values.

FIG. 11 presents an example user interface screen 1100 that provides a result 1108, in the form of a prediction. The result 1108 can be an indication of how likely an outcome (e.g., success) is for a particular set of input values.

A panel 1112 of the screen 1100 lists a plurality of feature groups 1120. For each feature group 1120, the contribution 1124 of the feature group to the result 1108 is displayed. The contribution 1124 can be normalized or otherwise calculated such that the sum of all contributions 1124 is 100%, or at least that the sum of the contributions is less than 100%, if contributions come from features that are not assigned to feature groups or from feature groups that are not displayed in the panel 1112. Visual indicators 1132, such as bars, can be displayed to help visually convey the contributions 1124 of the feature groups 1120.

A user can select to expand or collapse a feature group 1120 to see contributions 1130 from individual features 1134 in a feature group. Typically, the sum of the contributions 1130 in a feature group 1120 will equal the contribution 1124 of the feature group. However, other metrics can be used. For example, certain feature groups 1120, or features 1134, can be weighted more or less heavily than other feature groups or features. Or, a measure of the importance of a feature group 1120 can be presented that takes into account a number of features in a feature group. For example, the contribution or importance of a feature group 1120 can be calculated as the mean (average) value of features 1134 in the group. In this case, the contribution of a feature group 1120 is weighted by considering the number of features in a feature group. However, in other cases, contributions for feature groups 1120 are not weighted, as a group may be of higher importance if it has a higher absolute contribution to the result 1108, even if it also has a larger number of features 1134 than other feature groups.

As described in Example 1, a user can adjust a machine learning model based on features groups 1124. Retraining the machine learning model based on selected features 1134/feature groups 1120 can improve the performance of the model, at least for certain scenarios, where improved performance can be one or both of improved accuracy or improved performance (e.g., speed or efficiency, such as processing fewer features/data, using less memory or processor resources).

As shown in FIG. 11, a user can select boxes 1140 for a feature group 1120 or individual features 1134. By selecting an icon 1144, the user can retrain the model using the selected features 1134/feature groups 1120.

Example 12—Example Construction and Use of Feature Groups

Figure 12:
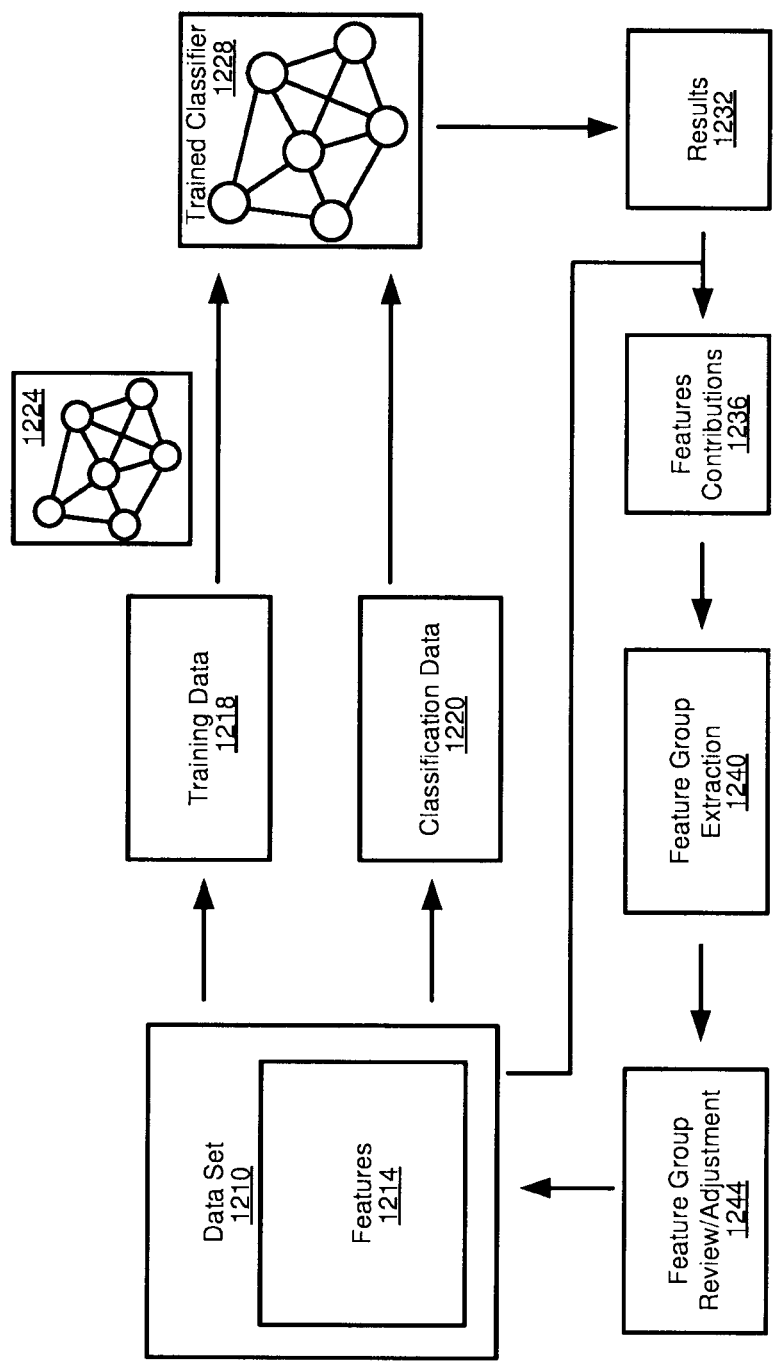
FIG. 12 is diagram schematically illustrating how a data set can be processed to train and use a machine learning model, and how features used as input in these processes can be analyzed and used to form feature groups.

FIG. 12 is a diagram illustrating how feature groups can be determined from a data set 1210 and optionally use to train (e.g., retrain) a machine learning model. The data set 1210 is obtained from one or more data sources (not shown), including as described in Examples 1-11. The data set 1210 includes a plurality of features 1214, at least a portion of which are used in training a machine learning model or to provide a classification result using a trained classifier.

The data set 1210 can be split into multiple portions, including a portion that serves as training data 1218 and a portion that serves as classification data 1220 (or, more generally, as an analysis data set). The training data 1218 can be processed by a machine learning algorithm 1224 to provide a trained classifier 1228. The classification data 1220 can be processed by the trained classifier 1228 to provide results 1232. The results 1232 and a portion of the data set 1210 can be processed to provide feature contributions 1236. The feature contributions 1236 can include contextual contribution values, such as contextual or overall SHAP or LIME values, overall contribution values (including as defined in Example 13), or a combination thereof.

Feature groups can be extracted at 1240. Extracting feature groups at 1240 can include analyzing feature contributions to determine related/dependent features. Extracting feature groups at 1240 can include extracting feature groups, or determining membership in feature groups, based on other considerations, such as relationships between the features in the one or more data sources used to form the data set 1210, data access requests in obtaining the data for the data set, or any predefined feature groups that may have been provided. Extracting feature groups at 1240 can also include applying one or more clustering techniques to the features, including based on data associated with the features in the data set 1210, the results 1232, the feature contributions determined at 1236, or a combination of these factors.

Feature groups can be reviewed or adjusted at 1244. Reviewing and adjusting feature groups at 1244 can include a user manually reviewing or adjusting feature groups, which can include adding or removing feature groups, or adding or removing features from feature groups. In other cases, feature group review and adjustment can be performed automatically, such as by using rules to analyze relationships between features in feature groups and to reject features, for example, that do not satisfy a threshold for membership in a feature group, or to remove feature groups where criteria for forming a feature group are not satisfied (e.g., features in the feature group to not satisfy a minimum predictive contribution threshold set for feature groups, a threshold number of features in a feature group is not met, features in a feature group are not sufficiently related/dependent, other factors, or a combination of these or other factors).

Feature groups determined as a result of the extraction at 1240 and review/adjustment at 1244 can optionally be used to retrain the trained classifier 1228. Or the feature groups can be used with the same data set 1210 or a new data set in training the machine learning algorithm 1224, classifying the classification data 1220 using the trained classifier 1228 as has been described, after which feature contributions 1236 can be extracted, feature groups can be extracted at 1240, and review/adjustment can again take place at 1244. This process can then continue as desired.

Although shown as including a data set 1210 that is split into training data 1218 and classification data 1220, in some embodiments, training data and classification data need not come from a training data set. In at least some cases, whether a common data set is needed can depend on a particular technique used for the machine learning algorithm 1224. In addition, one or more of feature contributions determined at 1236, feature group extraction at 1240, and feature group review/adjustment at 1244 can be carried out using results 1232 from multiple data sets 1210 (which can have been used solely as classification data or can be a classification data portion of the data set). For example, aggregated SHAP values can be determined from results 1232 of multiple sets of classification data 1220. Other techniques, such as cross-validation, can be used to help determine whether two sets of results 1232 are suitably comparable for use in steps 1236, 1240, 1244. In some cases, at least a portion of the training data 1218 can be used as classification data 1220.

Also, it should be appreciated that not all disclosed technologies need use a machine learning model 1224 in identifying feature groups. As explained in Examples 1 and 3-7, feature groups can be determined manually or based on data sources associated with features or relationships between the features/data sources. Similarly, feature groups can be identified using a trained ML model using techniques such as clustering features using mutual information or supervised correlation. However, feature groups determined using such other techniques can, if desired, be used with a machine learning algorithm 1224/trained classifier 1228, such as for determining how to train the ML algorithm 1224 or in interpreting results 1232 provided by the trained classifier.

While many of the Examples discuss the use of feature groups with respect to classification machine learning tasks/algorithms, it should be further appreciated that the disclosed technologies, including the identification and use of feature groups, can be used with other types of machine learning algorithms, including for multi-class classification or regression.

Example 13—Example Calculation and Comparison of Contextual and Overall Feature Contributions In some cases, information regarding the importance of a feature to a machine learning model (or a particular result provided using such a model) can be assessed by comparing the contextual importance of the features, such as determined by SHAP or LIME calculations, with the overall importance of the feature based on a single-variable predictive model (e.g., the strength of an association between the feature and the result). That is, for example, differences between contextual and overall importance can indicate relationships that might not be revealed by typical overall importance analysis for single-features, or even using contextual analysis for features.

In a specific example, the overall importance (e.g., using a single-variable SHAP value) of a feature, X, can be calculated as:

$$\frac{1}{N}\sum_{i=1}^{N}|\psi_{(X,i)}| = \frac{1}{N}\sum_{i=1}^{N}|logit(\hat{P}(Y|X=x_i)) - logit(\hat{P}(Y))|$$

Where $x_i$ is the value of feature X for observation i, and N is the number of observations in the test set.

In a specific example, using the SHAP technique, the contextual importance of a feature X (using contextual SHAP values) can be calculated as:

$$\frac{1}{N}\sum_{i=1}^{N}|\phi_{X,i}|$$

Where $\phi_{X,i}$ is the contextual SHAP value for feature X and observation i.

Overall and contextual importance for one or more features can be compared, including using a column chart or a scatter plot. Features with a large difference between overall and contextual importance can be flagged for review. In some cases, a threshold difference can be set, and features satisfying the threshold can be presented to a user. In addition, a correlation between the contextual and overall importance of a feature that is low (e.g., <<1) can indicate that the feature has a reversed relationship to a result than what might have been expected from the overall (single-variable) SHAP value.

Statistics for features identified using this technique can be further analyzed, such as analyzing statistics for different values of the feature. Differences in the number of data points in a data set having a particular value, and the association of that value with a particular result, can provide information that can be used to adjust the machine learning model or to alter behavior in order to influence a result, which can be an actual (analog-world) result or a result obtained using a machine learning model.

Patterns for values of a feature can also be compared using overall and contextual measures. For example, it may be that a variation between overall and contextual measures occurs only for one or a specified subset of values of the feature. Or, it can be that a difference is more consistently observed (e.g., for all values or for a larger subset of values). The consistency of the difference can be calculated as the Pearson's correlation between a feature's contextual SHAP value and its overall association (single variable SHAP value) with a target (result). Values close to 1 can indicate high consistency, while values closer to 0 can indicate less or no consistency. Negative values can indicate the presence of an anomalous relationship, such as Simpson's Paradox.

In a specific example, the overall and contextual importance of a feature can be presented on a plot that also illustrates consistency between the overall and contextual importance over a range of values. For example, a plot can have importance value presented on a Y axis and values for a particular feature on an X axis, where the contextual and overall importance values are plotted, including showing variations in consistency of the contextual and overall values over various observations in a data set (e.g., for multiple input instance).

Example 14—Example Determination and Use of Causality Information

As explained in Example 1, causality information can be determined and used to analyze a machine learning model, and perhaps to modify the model. For example, an initial set of results provided by the model can be analyzed, including to determine features that affect other features. At least certain features that are dependent on other features can be excluded from retaining the model. In this manner, the effect of a particular feature (or group of feature) on a result can be isolated by reducing or eliminating effects of dependent features. Similar analysis and training can be carried out using groups of features.

Relationships between features can be determined using various methods, including those described in Examples 1-13. For a given feature and its dependent features, the features can be further classified, including manually. Such further classification can include determining whether a feature is an actionable feature or a non-actionable feature. An actionable feature can be a feature that is that may be influenced or changed, such as by someone using the results of the ML model or during a scenario that is modeled using the ML model. As an example, it could be identified that a feature of gender or country of birth has an influence on features such as occupation or education. However, while occupation or education may be actionable (e.g., someone could be provided with assistance to have a different occupation or to have a different educational status), features such as gender or country of birth are not actionable.

Features can be classified in to feature groups using characteristics such as whether they are actionable or non-actionable features. For example, for a given feature group category, additional subcategories can be formed for actionable features and non-actionable features. In this case, one or more of the subcategories can be used as feature groups, while the original parent group, need not be used.

When analyzing a particular issue, a user can select to train a machine learning model using relevant features/feature groups, or select an appropriately trained ML model. For example, if a particular actionable feature is of interest, a user may wish to train the model using data for that actionable feature and relevant features/feature groups. In some cases, relevant features/feature groups can be those that are not dependent on the feature of interest (or a feature group of which the feature of interest is a member). In other cases, relevant features/feature groups can be, or can include, features that are dependent on the feature of interest (or a group of which the feature of interest is a member). Similarly, in some cases, relevant features/feature groups can be actionable features while in other cases relevant features/feature groups are non-actionable features. Various combinations of actionable/non-actionable and dependent/independent features/feature groups, can be used as desired.

Using these techniques can provide various advantages, including helping a user understand the relative contribution of actionable/non-actionable features/feature groups. In at least some cases, actionable features may be a relatively small sub-set of the features used in a ML model. In any event, being able to focus on actionable features can help a user better understand how different outcomes might be achieved for a given scenario modeled by the ML model.

In addition, using causality information, a user can exclude dependent features from an analysis (for example, by excluding them from model training) to obtain a better understanding of the total influence of a feature, such as an actionable feature, on an outcome by excluding intermediated consequences of the feature of interest.

Example 15—Example Methods of Training and Using Classifier

Figure 13:
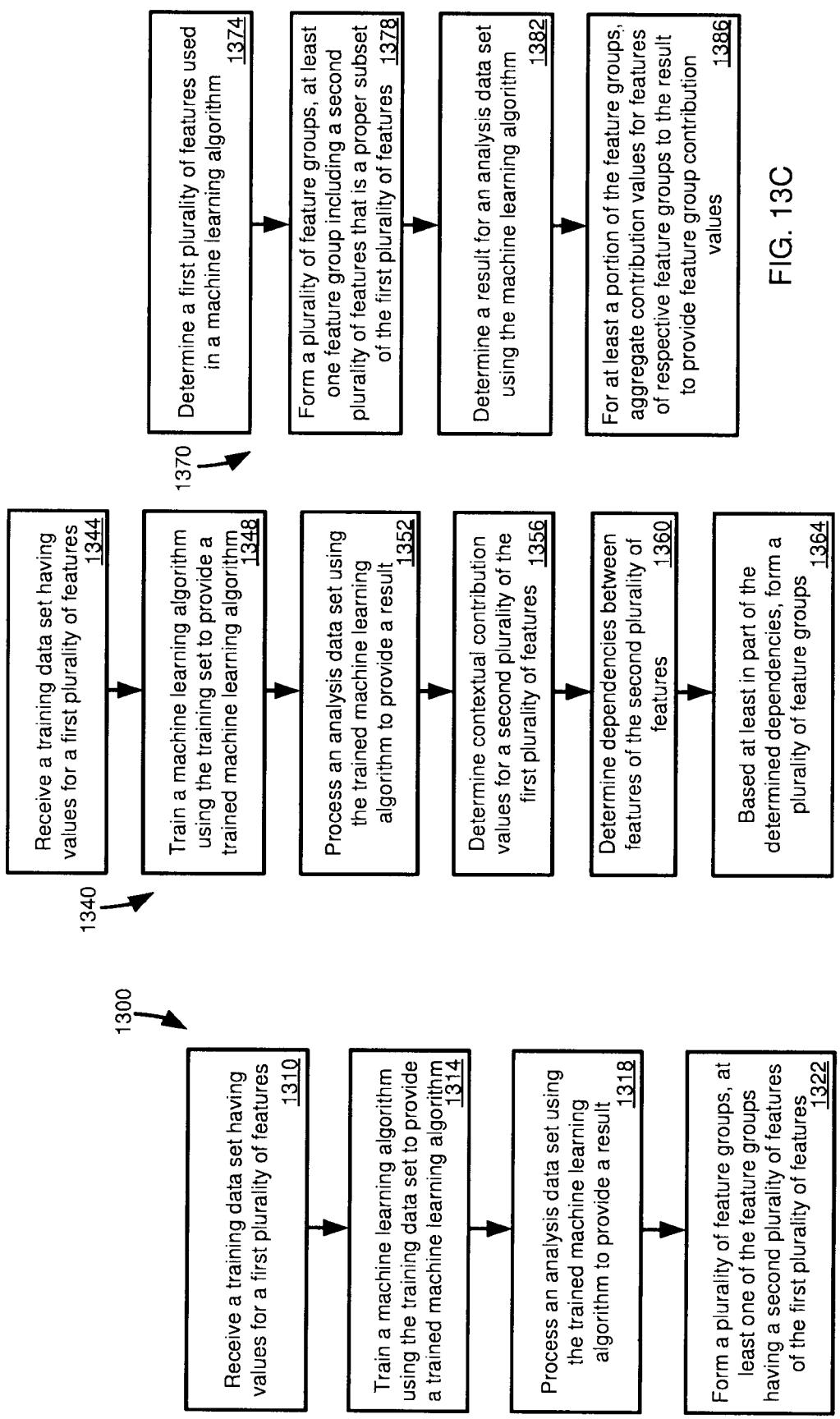
FIG. 13A is a flowchart of an example method for forming feature group.
FIG. 13B is a flowchart of an example method for forming feature groups at least in part by analyzing dependencies between features used as input for a machine learning model.
FIG. 13C is a flowchart of an example method for forming feature groups and calculating their contribution to a result provided by a machine learning model.

FIG. 13A is a flowchart of an example method 1300 of forming feature groups. At 1310, a training data set is received. The training data set includes values for a first plurality of features. A machine learning algorithm is trained at 1314 using the training data set to provide a trained machine learning algorithm. At 1318, an analysis data set is processed using the trained machine learning algorithm to provide a result. A plurality of feature groups are formed at 1322. At least one of the feature groups includes a second plurality of features of the first plurality of features. The second plurality of features is a proper subset of the first plurality of features.

FIG. 13B is a flowchart of an example method 1340 of forming feature groups using dependencies between features in a data set. At 1344, a training data set is received. The training data set includes values for a first plurality of features. A machine learning algorithm is trained at 1348 using the training data set to provide a trained machine learning algorithm. At 1352, an analysis data set is processed using the trained machine learning algorithm to provide a result. Contextual contribution values are determined at 1356 for a second plurality of the first plurality of features. Dependencies between features of the second plurality of features are determined at 1360. At 1364, a plurality of feature groups are formed based at least in part on the determined dependencies. At least one feature group of the plurality of feature groups includes a third plurality of features of the first plurality of features. The third plurality of features is a proper subset of the first plurality of features.

FIG. 13C is a flowchart of an example method 1370 of determining feature group contribution values. At 1374, a first plurality of features used in a machine learning algorithm are determined. A plurality of feature groups are formed, at 1378, such as using analysis of machine learning results, semantic analysis, statistical analysis, data lineage, or combinations thereof. At least one feature group of the plurality of feature groups includes a second plurality of features of the first plurality of features. The second plurality of features is a proper subset of the first plurality of features. At 1382, a result is determined for an analysis data set using the machine learning algorithm. For at least a portion of the feature groups, at 1386, contribution values for features of respective feature groups to the result are aggregated to provide feature group contribution values.

Example 16—Computing Systems

Figure 14:
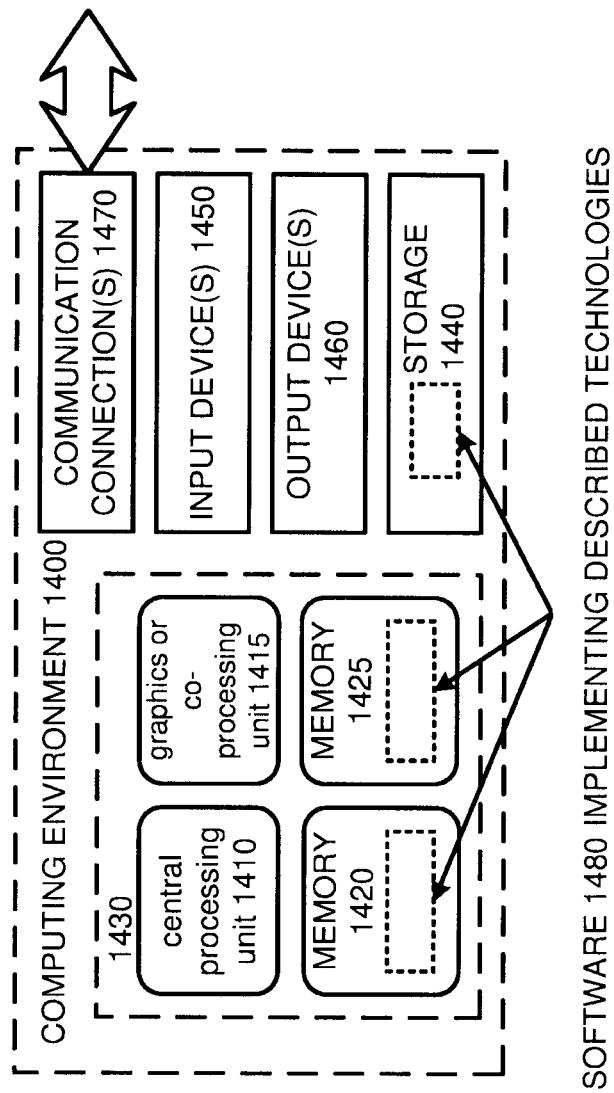
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing the technologies described in Examples 1-15. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 17—Cloud Computing Environment

Figure 15:
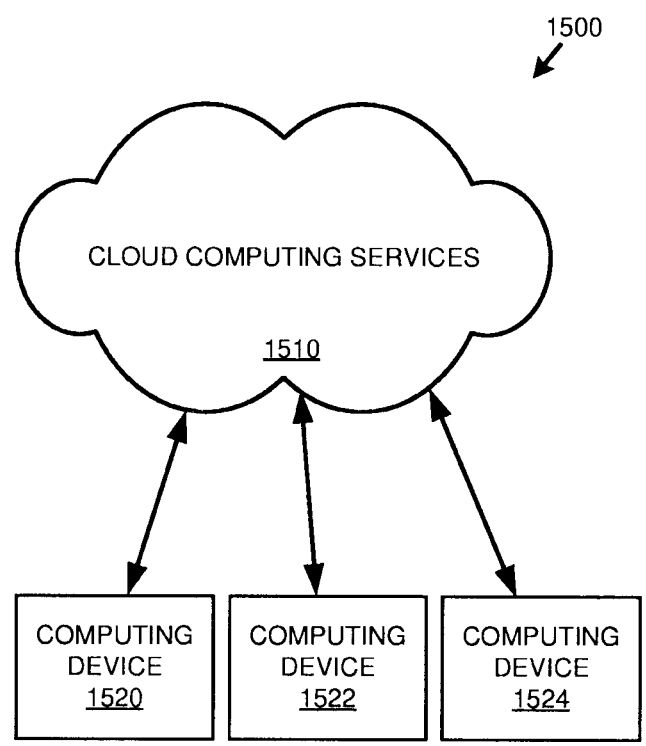
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example 17—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more computer readable storage media storing instructions that, when executed, cause the computing system to perform operations comprising:
      receiving a training data set, the training data set comprising values for a first plurality of features;
      training a machine learning algorithm using the training data set to provide a trained machine learning model
      processing an analysis data set using the trained machine learning model to provide a result;
      forming a plurality of feature groups, at least one of the feature groups comprising a second plurality of features of the first plurality of features, the second plurality of features being a proper subset of the first plurality of features, the forming a plurality of feature groups comprising determining contextual contributions of at least a portion of the first plurality of features to the result and detecting causality cycles within feature groups; and
      in response to determining contextual contributions and detecting causality cycles, determining which features and feature groups to employ in retraining the machine learning model.

2. The computing system of claim 1, wherein the contextual contributions are calculated as SHAP values.

3. The computing system of claim 1, wherein the contextual contributions are calculated as LIME values.

4. The computing system of claim 1, the operations further comprising:
   for at least a portion of the first plurality of features, determining an overall contribution of a respective feature; and
   for a third plurality of features selected from the first plurality of features, comparing the overall contribution of a given feature of the third plurality of features with the contextual contribution of the given feature.

5. The computing system of claim 4, the operations further comprising:
   carrying out the comparing the overall contribution of the feature for a plurality of input instances of the data set to determine consistency values for respective features of the third plurality of features.

6. The computing system of claim 1, the operations further comprising:
   aggregating contributions of features associated with the plurality of feature groups to provide aggregated contribution values for feature groups of the plurality of feature groups.

7. The computing system of claim 6, the operations further comprising:
   calculating a significance value for at least one feature group of the plurality of feature groups as the mean of contribution values of features belonging to the at least one feature group.

8. The computing system of claim 7, the operations further comprising:
   rendering for display a user interface screen displaying at least a portion of the plurality of feature groups and significance values for respective features groups of the at least a portion of the plurality of feature groups.

9. The computing system of claim 6, the operations further comprising:
   rendering for display a user interface screen displaying at least a portion of the plurality of feature groups and features which are members of respective feature groups.

10. The computing system of claim 9, the operations further comprising:
    receiving user input adding to a feature group of the plurality of feature groups, or removing from a feature group of the first plurality of feature groups, at least one feature of the first plurality of features.

11. The computing system of claim 1, the operations further comprising:
    adjusting the trained classifier based at least in part on one or more feature groups of the plurality of feature groups.

12. The computing system of claim 1, wherein forming a plurality of feature groups further comprises:
    analyzing a data model associated with a third plurality of the first plurality of features, the third plurality of features being a subset of the first plurality of features;
    from the data model, determining a plurality of data model elements;
    defining at least one feature group based at least in part on a data model element of the plurality of data model elements;
    determining a fourth plurality of features selected from the first plurality of features that are members of the data model element; and
    assigning at least a portion of the fourth plurality of features to the at least one feature group.

13. The computing system of claim 1, wherein forming a plurality of feature groups further comprises:
  analyzing a plurality of data access operations used to obtain at least a portion of data in the data set;
  determining one or more data sources accessed by the plurality of data access operations;
  defining at least one feature group based at least in part on a data access operation of the plurality of data access operations;
  determining a fourth plurality of features selected from the first plurality of features that are members of the one or more data sources; and
  assigning at least a portion of the fourth plurality of features to the at least one feature group.

14. The computing system of claim 1, wherein forming a plurality of feature groups further comprises:
  determining dependency information for a plurality of pairs of features of the first plurality of features; and
  forming at least one feature group of the plurality of feature groups based at least in part on determining features of the first plurality of features that are dependent on a first feature of the first plurality of features using dependency information for the first feature.

15. The computing system of claim 14, wherein the dependency information comprises a signed chi-squared test.

16. The computing system of claim 14, wherein determining dependency information comprises determining pairs of features satisfying a threshold dependency level.

17. One or more computer-readable storage media comprising:
  computer-executable instructions that, when executed by a computing system comprising at least one hardware processor and at least one memory coupled to the at least one hardware processor, cause the computing system to receive a training data set, the training data set comprising values for a first plurality of features;
  computer-executable instructions that, when executed by the computing system, cause the computing system to train a machine learning algorithm using the training data set to provide a trained machine learning algorithm;
  computer-executable instructions that, when executed by the computing system, cause the computing system to process an analysis data set using the trained machine learning algorithm to provide a result;
  computer-executable instructions that, when executed by the computing system, cause the computing system to determine contextual contribution values for a second plurality of the first plurality of features;
  computer-executable instructions that, when executed by the computing system, cause the computing system to determine dependencies between features of the second plurality of features;
  computer-executable instructions that, when executed by the computing system, cause the computing system to, based at least in part on the determined dependencies, form a plurality of feature groups, at least one feature group of the plurality of feature groups comprising a third plurality of features of the first plurality of features, the third plurality of features being a proper subset of the first plurality of features, the forming a plurality of feature groups comprising determining contextual contributions of at least a portion of the first plurality of features to the result and detecting causality cycles within feature groups; and
  computer-executable instructions that, when executed by the computing system, cause the computing system to, in response to determining contextual contributions and detecting causality cycles, determine which features and feature groups to employ in retraining the machine learning model.

18. A method, implemented in a computing system comprising a memory and one or more processors, comprising:
  determining a first plurality of features used in a machine learning algorithm;
  forming a plurality of feature groups, at least one feature group of the plurality of feature groups comprising a second plurality of features of the first plurality of features, the second plurality of features being a proper subset of the first plurality of features;
  determining a result for an analysis data set using the machine learning algorithm;
  for at least a portion of the feature groups, aggregating contribution values for features of respective feature groups to the result to provide feature group contribution values, the forming a plurality of feature groups comprising determining contextual contributions of at least a portion of the first plurality of features to the result and detecting causality cycles within feature groups; and
  in response to determining contextual contributions and detecting causality cycles, determining which features and feature groups to employ in retraining the machine learning model.

19. The method of claim 18, wherein forming a plurality of feature groups further comprises:
  analyzing a data model associated with a third plurality of the first plurality of features, the third plurality of features being a subset of the first plurality of features;
  from the data model, determining a plurality of data model elements;
  defining at least one feature group based at least in part on a data model element of the plurality of data model elements;
  determining a fourth plurality of features selected from the first plurality of features that are members of the data model element; and
  assigning at least a portion of the fourth plurality of features to the at least one feature group.

20. The method of claim 18, wherein forming a plurality of feature groups further comprises:
  analyzing a plurality of data access operations used to obtain at least a portion of data in the data set;
  determining one or more data sources accessed by the plurality of data access operations;
  defining at least one feature group based at least in part on a data access operation of the plurality of data access operations;
  determining a fourth plurality of features selected from the first plurality of features that are members of the one or more data sources; and
  assigning at least a portion of the fourth plurality of features to the at least one feature group.

* * * * *